United States Patent
Joo et al.

(10) Patent No.: US 7,796,648 B2
(45) Date of Patent: Sep. 14, 2010

(54) APPARATUS AND METHOD FOR GENERATING AND PARSING MAC PDU IN A MOBILE COMMUNICATION SYSTEM

(75) Inventors: Yang-Ick Joo, Seoul (KR); Soeng-Hun Kim, Suwon-si (KR); Byoung-Jae Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 12/248,408

(22) Filed: Oct. 9, 2008

(65) Prior Publication Data

US 2009/0092138 A1   Apr. 9, 2009

(30) Foreign Application Priority Data

| Oct. 9, 2007 | (KR) | ...................... 10-2007-0101441 |
| Oct. 11, 2007 | (KR) | ...................... 10-2007-0102364 |
| Oct. 31, 2007 | (KR) | ...................... 10-2007-0110204 |
| Dec. 12, 2007 | (KR) | ...................... 10-2007-0129060 |

(51) Int. Cl.
*H04J 3/24* (2006.01)
(52) U.S. Cl. ...................................... 370/474; 370/392
(58) Field of Classification Search ................. 370/389, 370/392, 473, 474, 475, 476
See application file for complete search history.

(56) References Cited

U.S. PATENT DOCUMENTS

| 6,788,944 | B2* | 9/2004 | Jiang ........................... 455/450 |
| 6,904,016 | B2 | 6/2005 | Kuo et al. |
| 7,197,024 | B2* | 3/2007 | Huo ............................ 370/338 |
| 7,295,573 | B2* | 11/2007 | Yi et al. ....................... 370/469 |
| 7,684,407 | B2* | 3/2010 | Kuchibhotla et al. ...... 370/395.3 |
| 2005/0265390 | A1 | 12/2005 | Lee et al. |
| 2005/0286451 | A1 | 12/2005 | Kim et al. |
| 2007/0047582 | A1* | 3/2007 | Malkamki .................... 370/470 |
| 2009/0088195 | A1* | 4/2009 | Rosa et al. ................... 455/507 |
| 2009/0092202 | A1* | 4/2009 | Kim et al. .................... 375/295 |
| 2009/0141670 | A1* | 6/2009 | Duncan Ho ................. 370/328 |
| 2009/0163211 | A1* | 6/2009 | Kitazoe et al. .............. 455/436 |
| 2010/0128742 | A1* | 5/2010 | Chun et al. .................. 370/474 |

* cited by examiner

*Primary Examiner*—Ricky Ngo
*Assistant Examiner*—Christine Ng
(74) *Attorney, Agent, or Firm*—Jefferson IP Law, LLP

(57) ABSTRACT

An apparatus and method for generating and parsing a MAC PDU in a mobile communication system are provided in which LCIDs of MAC SDUs to be multiplexed are checked, the length of an LF is determined for each of the MAC SDUs, referring to LF lengths predetermined for the LCIDs, a MAC header including the LCIDs and LFs of the determined lengths for the MAC SDUs is generated, and a MAC PDU is generated by attaching the MAC header to payload including the MAC SDUs. During the MAC header generation, if a padding size required for the MAC PDU generation calculated taking into account the absence of a last LF in the MAC header is larger than the length of the last LF, the last LF is included in the MAC header, the required padding size is recalculated, taking into account the inclusion of the last LF, and a padding is added according to the re-calculated padding size.

20 Claims, 17 Drawing Sheets

APPARATUS AND METHOD FOR GENERATING AND PARSING MAC PDU IN A MOBILE COMMUNICATION SYSTEM

PRIORITY

This application claims the benefit under 35 U.S.C. §119 (a) of a Korean patent application filed in the Korean Intellectual Property Office on Oct. 9, 2007 and assigned Ser. No. 2007-101441, a Korean patent application filed in the Korean Intellectual Property Office on Oct. 11, 2007 and assigned Ser. No. 2007-102364, a Korean patent application filed in the Korean Intellectual Property Office on Oct. 31, 2007 and assigned Ser. No. 2007-110204, and a Korean patent application filed in the Korean Intellectual Property Office on Dec. 12, 2007 and assigned Ser. No. 2007-129060, the entire disclosures of all of which are hereby incorporated by reference.

BACKGROUND OF THE INVENTION

1. Field of the Invention

The present invention relates to a mobile communication system. More particularly, the present invention relates to an apparatus and method for generating a Medium Access Control (MAC) header with optimized information and interpreting the MAC header.

2. Description of the Related Art

Mobile communication systems are being developed to provide high-speed, high-quality wireless data packet communication systems that provide data service and multimedia service beyond the traditional voice service. A 3rd Generation (3G) mobile communication system, operating in Wideband Code Division Multiple Access (WCDMA), Universal Mobile Telecommunication Service (UMTS), which is based on the European systems, Global System for Mobile Communications (GSM) and General Packet Radio Services (GPRS), provides a uniform service of transmitting packet-based text, digitized audio or video data, and multimedia data at or above 2 Mbps to mobile phone users or computer users all over the world. The UMTS system enables access to any end in a network, relying on the concept of packet-switched access using a packet protocol such as Internet Protocol (IP).

The 3 rd Generation Partnership Project (3GPP), working on UMTS standardization, is discussing Long Term Evolution (LTE) as a future-generation UMTS mobile communication system. LTE aims at high-speed packet communications at about 100 Mbps and for this purpose, many schemes are under discussion. Among them, there are techniques for reducing the number of nodes on a communication line by simplifying a network configuration or optimizing a wireless protocol to radio channels.

FIG. 1 illustrates a functionality of a MAC layer in a conventional LTE mobile communication system.

Referring to FIG. 1, in a transmitter, first and second Radio Link Control (RLC) entities 102 and 104 each construct an RLC Protocol Data Unit (PDU) with RLC Service Data Units (SDUs) received from an upper layer. A MAC layer 106 transmits the RLC PDUs to a receiver through a PHYsical (PHY) layer 108. In the receiver, a MAC layer 112 receives the RLC PDUs through a PHY layer 110 and provides them to their associated RLC entities 114 and 116. The RLC entities 114 and 116 extract the RLC SDUs and provide them to an upper layer.

The RLC PDUs are interpreted as MAC SDUs in the MAC layer 106. The MAC layer 106 generates a MAC header and configures a MAC PDU by concatenating the MAC header and the MAC SDUs. The MAC PDU may include MAC SDUs for control of transmission and reception between the MAC layers 106 and 112 of the transmitter and the receiver in addition to the MAC SDUs received from the RLC entities 102 and 104. The control MAC SDUs can be transmitted together with the data MAC SDUs in the MAC PDU or alone in the MAC PDU. Therefore, the header of the MAC PDU (referred to as the MAC header) is configured so that the control MAC SDUs can be distinguished from the data MAC SDUs.

FIG. 2A illustrates a MAC PDU format in a conventional mobile communication system.

Referring to FIG. 2A, a MAC PDU includes a MAC header 200 and Payloads 209, 210 and 211 each carrying one or more MAC SDUs. The MAC header 200 includes Logical Channel Identifications (LCIDs) 201, 204 and 207, Es 202, 205 and 208, and Lengths 203 and 206.

The LCIDs 201, 204 and 207 identify MAC SDUs delivered on different logical channels.

The Es 202, 205 and 208 each indicate whether there is another multiplexed MAC SDU. If an E is 0, this means that a MAC SDU corresponding to the E is the last MAC SDU. If an E is 1, this means that another multiplexed MAC SDU follows a MAC SDU corresponding to the E. In the latter case, a Length Field (LF) and an LCID follow the E.

The LFs 203 and 206 indicate the lengths of MAC SDUs corresponding to them. Hence, the LFs 203 and 206 should be long enough to represent the lengths of the MAC SDUs.

A minimum unit of multiplexed related information in a MAC header is referred to as a "subheader". For instance, a subheader for a MAC SDU can be header information including an LCID, an E, and an LF. In some cases, part of the subheader may be omitted or one MAC header may include different types of subheaders. Although it is not a subheader for a MAC SDU, a later-described padding header is treated as a subheader carrying information about padding.

Referring to FIG. 2A, in the MAC header 200, a first subheader 213 with the LCID 201, the E 202, and the LF 203 relates to the first MAC SDU 209, a second subheader 215 with the LCID 204, the E 205, and the LF 206 relates to the second MAC SDU 210, and a third subheader 217 with the LCID 207 and the E 208 relates to the third MAC SDU 211.

As noted from FIG. 2A, the third subheader 217 does not include an LF because a MAC PDU size, i.e. a Transport Block (TB) size is known to both the transmitter and the receiver and thus the receiver can determine the size of the third MAC SDU 211 by subtracting the sum of the lengths of the LFs 203 and 206 and the length of the MAC header 200 from the TB size. Hence, an LF is not needed for the third MAC SDU 211 and instead, other user data can be transmitted in place of the LF. As a consequence, transmission efficiency is increased.

For accurate data transmission/reception, however, both the transmitter and the receiver should know which MAC SDU does not include an LF. For providing this information, two methods are usually considered.

In a first method, the transmitter notifies the receiver of the position of the absent LF. In a second method, the transmitter and the receiver preliminarily agree on the absence of an LF in a subheader at a particular position. Typically, an LF is absent in the last subheader.

However, the absence of the LF in the last subheader causes the following problem.

In general, a MAC PDU is padded. In padding the MAC PDU, padding bits (or dummy bits) are added in an empty space of a TB that has a smaller amount of transmission data than a predetermined TB size in order to match the TB to the predetermined TB size. To indicate the padding, a "padding subheader" is added to the header of the MAC PDU. If room still exists, payload is padded.

The absence of the last LF causes the following problem if the size of the padding is equal to or less than that of the last LF. Herein, the last LF refers to "the LF for the last MAC SDU" of one or more MAC SDUs included in a MAC PDU.

In the case where a TB size is set to 100 bytes and the last LF is 2 bytes, the absence of the last LF creates a 2-byte space empty in the TB, which is available for additional data transmission. If 1-byte of data is to be added, a necessary padding is 1 byte. If there is no additional data to be transmitted, a necessary padding is 2 bytes. In this case where the padding size is equal to or less than the size of the LF, the following contradiction is faced.

First, when the last LF is not included and 1-byte of data is added, 1-byte of padding is needed. To indicate the padding, a padding subheader is attached to the MAC header, which makes the last subheader no longer in the last place. Since the last LF is not the "LF for the last subheader", it should not be omitted. Then the last 2-byte LF should be included in the MAC header, increasing the size of the TB to 102 bytes. Accordingly, the contradiction that the 1-byte of additional data and the 1-byte of padding should be deleted occurs.

Second, if the last LF is not included and there is no data to be added, a necessary padding is 2 bytes. This case also causes the above-described contradiction.

SUMMARY OF THE INVENTION

An aspect of the present invention is to address at least the above-mentioned problems and/or disadvantages and to provide at least the advantages described below. Accordingly, an aspect of the present invention is to provide an apparatus and method for generating a MAC PDU with an optimized MAC header and an apparatus and method for receiving and parsing a MAC PDU in a mobile communication system.

Another aspect of the present invention is to provide an apparatus and method for simplifying a MAC PDU generation process and thus increasing a data processing speed by making it clear whether the last LF is included or not in a MACP PDU in a mobile communication system.

Yet another aspect of the present invention is to provide an apparatus and method for generating a MAC PDU such that the last LF is not included in a MAC header, for MAC header optimization but it is included in the MAC header if a necessary padding size is equal to or less than the size of the last LF, and an apparatus and method for receiving a MAC PDU in a mobile communication system.

In accordance with an aspect of the present invention, a method for generating a MAC PDU in a mobile communication system is provided. The method includes checking LCIDs of MAC SDUs to be multiplexed, determining the length of an LF for each of the MAC SDUs, referring to LF lengths predetermined for the LCIDs, generating a MAC header including the LCIDs and LFs of the determined lengths for the MAC SDUs, and generating a MAC PDU by attaching the MAC header to payload including the MAC SDUs. During the MAC header generation, if a padding size required for the MAC PDU generation calculated assuming the absence of a last LF in the MAC header is larger than the length of the last LF, the last LF is included in the MAC header, the required padding size is recalculated taking into account the inclusion of the last LF, and a padding is added according to the re-calculated padding size. If the required padding size is equal to or less than the length of the last LF, the last LF is included in the MAC header.

In accordance with another aspect of the present invention, an apparatus for generating a MAC PDU in a mobile communication system is provided. The apparatus includes at least one RLC entity for providing MAC SDUs to be multiplexed to a multiplexer, for checking LCIDs of the MAC SDUs, for determining the length of an LF for each of the MAC SDUs referring to LF lengths predetermined for the LCIDs, and for providing the LCIDs and the determined LF lengths to a header generator, wherein the header generator generates a MAC header including the LCIDs and LFs of the determined lengths for the MAC SDUs and provides the MAC header to the multiplexer, and the multiplexer multiplexes the MAC header with at least one of the MAC SDUs. If a padding size required for the MAC PDU generation calculated assuming the absence of a last LF in the MAC header is larger than the length of the last LF, the header generator includes the last LF in the MAC header, recalculates the required padding size taking into account the inclusion of the last LF, and adds a padding according to the re-calculated padding size. If the required padding size is equal to or less than the length of the last LF, the header generator includes the last LF in the MAC header.

In accordance with a further aspect of the present invention, a method for parsing MAC SDUs in a MAC PDU in a mobile communication system is provided. The method includes checking LCIDs of MAC SDUs multiplexed in a received MAC PDU from a MAC header of the MAC PDU, determining if a length of the MAC PDU, calculated using the MAC header, is equal to a known Transport Block (TB) size, determining that a last LF related to a last MAC SDU is included in the MAC header and the MAC SDUs are parsed from the MAC PDU according to LFs in the MAC header, if the length of the MAC PDU calculated using the MAC header is equal to the known TB size, and determining that the last LF is not included in the MAC header and parsing the MAC SDUs from the MAC PDU according to LFs in the MAC header and the absent last LF, if the length of the MAC PDU is different from the TB size.

In accordance with still another aspect of the present invention, an apparatus for parsing MAC SDUs in a MAC PDU in a mobile communication system is provided. The apparatus includes a header detector for checking LCIDs of MAC SDUs multiplexed in a received MAC PDU from a MAC header of the MAC PDU and for providing sizes of the multiplexed SDUs using LF lengths predetermined for the LCIDs to an SDU detector, wherein the SDU detector determines that a last LF related to a last MAC SDU is included in the MAC header and parses the MAC SDUs from the MAC PDU according to LFs in the MAC header, if a length of the MAC PDU calculated using the LCIDs and the MAC SDU sizes is equal to a known TB size, and determines that the last LF is not included in the MAC header and parses the MAC SDUs from the MAC PDU according to LFs in the MAC header and the absent last LF, if the length of the MAC PDU is different from the TB size.

In accordance with still a further aspect of the present invention, a method for generating a MAC PDU in a mobile communication system is provided. The method includes checking LCIDs of MAC SDUs to be multiplexed, checking the length of an LF for each of the MAC SDUs, referring to LF lengths predetermined for the LCIDs, generating a MAC header including the LCIDs and LFs of the determined lengths for the MAC SDUs, and generating a MAC PDU by attaching the MAC header to payload including the MAC SDUs. During the MAC header generation, if a required padding size is equal to or less than the sum of the lengths of the last LF and the length indicator, including the last LF and the length indicator in the MAC header, setting the E field to a value indicating the inclusion of the last LF and the length indicator, and setting the last LF to a predetermined value indicating a subheader including the last LF is a last subheader.

In accordance with yet another aspect of the present invention, an apparatus for generating a MAC PDU in a mobile communication system is provided. The apparatus includes at least one RLC entity for providing MAC SDUs to be multiplexed to a multiplexer, for checking LCIDs of the MAC SDUs, for determining the length of an LF for each of the MAC SDUs, referring to LF lengths predetermined for the LCIDs, and for providing the LCIDs and the determined LF lengths to a header generator, wherein the header generator generates a MAC header including the LCIDs and LFs of the determined lengths for the MAC SDUs and provides the MAC header to the multiplexer, and the multiplexer multiplexes the MAC header with at least one of the MAC SDUs. If a required padding size is equal to or less than the sum of the lengths of the last LF and the length indicator, the header generator includes the last LF and the length indicator in the MAC header, sets the E field to a value indicating the inclusion of the last LF and the length indicator, and sets the last LF to a predetermined value indicating a subheader including the last LF is a last subheader.

In accordance with yet a further aspect of the present invention, a method for parsing MAC SDUs in a MAC PDU in a mobile communication system is provided. The method includes checking LCIDs of MAC SDUs multiplexed in a received MAC PDU from a MAC header of the MAC PDU and checking an E field in the MAC header if the E field is set to a predetermined value indicating the absence of a last LF related to a last MAC SDU and a length indicator for the last LF, calculating a length of the last MAC SDU, taking into account the absent last LF and length indicator, and parsing the MAC SDUs from the MAC PDU using the LCIDs and the length of the last MAC SDU.

In accordance with yet still another aspect of the present invention, an apparatus for parsing MAC SDUs in a MAC PDU in a mobile communication system is provided. The apparatus includes a header detector for checking LCIDs of MAC SDUs multiplexed in a received MAC PDU from a MAC header of the MAC PDU and for checking an E field in the MAC header, and if the E field is set to a predetermined value indicating the absence of a last LF related to a last MAC SDU and a length indicator for the last LF, an SDU detector calculates a length of the last MAC SDU, taking into account the absent last LF and length indicator, and parses the MAC SDUs from the MAC PDU using the LCIDs and the length of the last MAC SDU.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
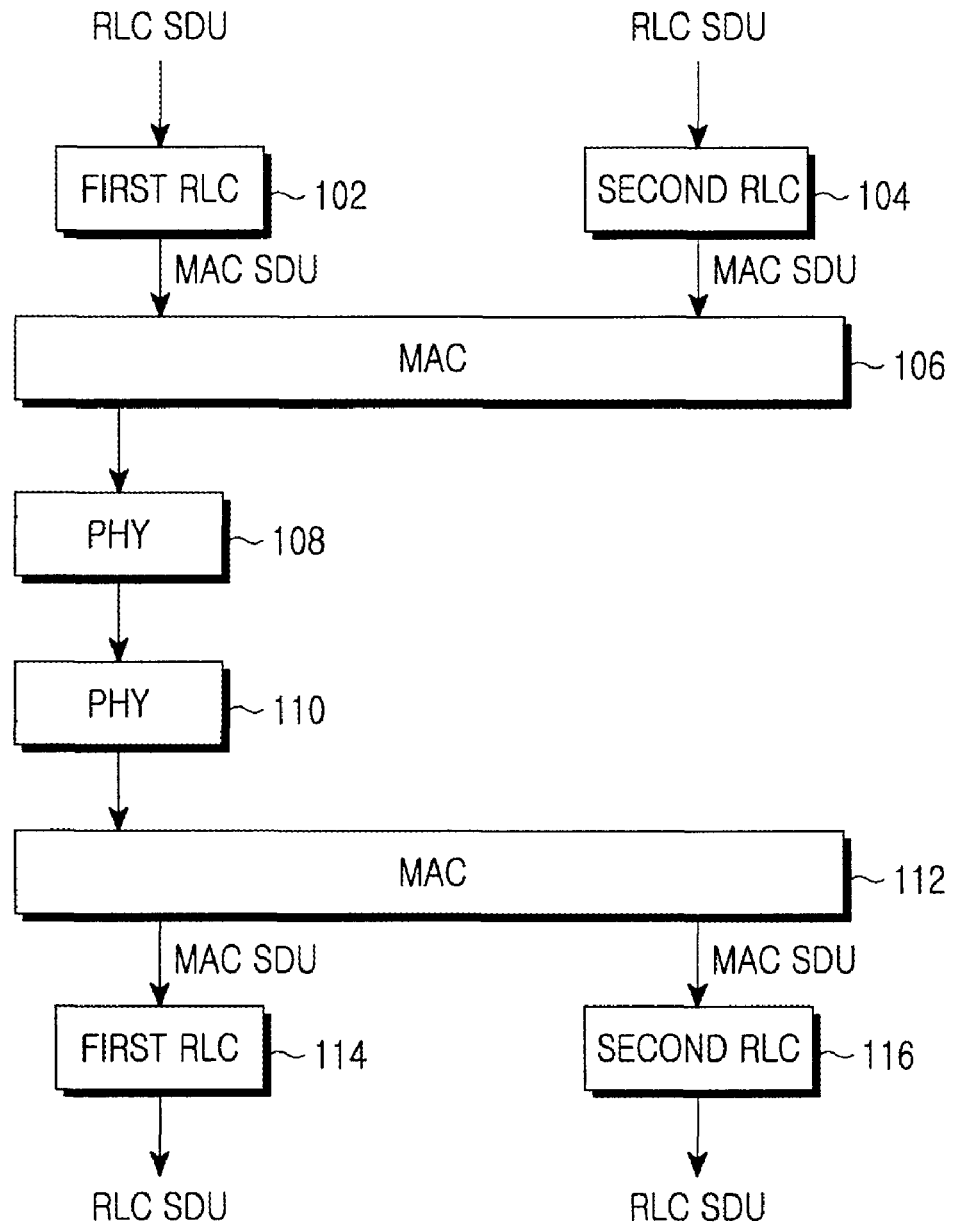
FIG. 1 illustrates a functionality of a MAC layer in a conventional LTE mobile communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While exemplary embodiments of the present invention will be described in the context of a 3GPP LTE system based on UMTS, it should be clear to those skilled in the art that the basic principle of the present invention regarding MAC header configuration is applicable to any other mobile communication system having a similar technological background and channel structure with a slight modification made within the scope of the present invention.

The present invention will be described below with reference to two exemplary embodiments. The first and second exemplary embodiments will be described with reference to FIGS. 2 to 6 and with reference to FIGS. 7, 8 and 9, respectively.

Embodiment 1

Before a detailed description of a first exemplary embodiment of the present invention is made, a primary concept of the exemplary embodiment will first be described. By and large, MAC Protocol Data Unit (PDU) generation involves two steps. One step is the ordering of MAC Service Data Units (SDUs) (SDU ordering) and the other step is the generating of a MAC PDU with the ordered MAC SDUs (PDU generation).

It is to be noted that only when a padding size is larger than 0, i.e. only when a padding exists, is the padding size compared with the length of the last LF in the exemplary embodiments of the present invention. In other words, the exemplary embodiments do not consider the absence of padding in a MAC PDU.

For optimization of a MAC header in accordance with an exemplary embodiment of the present invention, a Length Field (LF) and other fields related to the LF can be omitted altogether. Accordingly, it is to be understood that, although the following description only includes omission of an LF, the present invention is not so limited and other fields associated with the LF can also be omitted.

The SDU ordering will be described with reference to three exemplary embodiments of the present invention which illustrate how an LF length may be determined. In a first exemplary embodiment, the same LF length is set for every logical channel, in a second exemplary embodiment, different LF lengths are set for different logical channels, and in a third exemplary embodiment, an LF length is "a minimum value required to express a TB size".

The PDU generation may differ depending on whether a required padding size is equal to or less than the length of the last LF. That is, a MAC PDU is configured in a different manner depending on whether a padding size exceeds the length of the last LF or not.

If the required padding size exceeds the length of the last LF, it is re-calculated, taking into account the inclusion of the last LF and a MAC PDU is generated such that it is padded according to the re-calculated padding size and includes the last LF.

On the other hand, if the required padding size is equal to or less than the length of the last LF, then one of two exemplary embodiments is considered to address that situation.

In accordance with an exemplary embodiment of PDU generation, a MAC PDU is configured so as to include the last LF. As a further part of this exemplary embodiment, five cases can be contemplated which will be described later. In accordance with another exemplary embodiment of PDU generation, a MAC PDU is configured without the last LF. Specifically, the MAC PDU is padded without the last LF and a Reserved (R) field (or a particular indicator) is set to a certain value. The use of the R field is defined to indicate that "a MAC PDU is padded without the last LF" and the size of the padding can be indicated by a value of the R field.

Now a description will be made of exemplary embodiments of SDU ordering according to the present invention.

In the first exemplary embodiment of SDU ordering, a fixed LF length is set and MAC SDUs are ordered. Because every logical channel has the same LF length, the MAC SDUs can be ordered under no specific condition. For instance, the SDU ordering can be random.

In the second exemplary embodiment of SDU ordering, an LF length depends on a logical channel. The amount of data varies with a logical channel that delivers the data in the mobile communication system. Based on the concept that the amount of data to be delivered on a logical channel is known from the characteristics of the logical channel, different LF lengths are set for different logical channels in configuring a MAC header. From the perspective of the MAC header, an LF length varies with an LCID.

Then a subheader with the longest LF and a MAC SDU described by the subheader are positioned at the end of the MAC header and in the last Payload, respectively. If a MAC PDU is configured without the last LF, the absence of the longest LF increases transmission efficiency, thus optimizing the configuration of the MAC PDU.

The third exemplary embodiment of SDU ordering is characterized in that an LF length depends on a TB size in that it is set to "a minimum value required to express the TB size". The resulting prevention of unnecessary resource consumption renders MAC header configuration more efficient.

The MAC SDU ordering is followed by PDU generation as follows.

In order to determine whether to pad a MAC PDU, a padding size required for generating the MAC PDU is calculated, assuming the absence of an LF for the last of the ordered subheaders (i.e. the last LF). Then the calculated padding size is compared with the length of the last LF.

Two comparison results are of interest. The first is that the padding size exceeds the length of the last LF and the second is that the padding size is equal to or less than the length of the last LF.

Regarding the first result, if a TB is 100 bytes, the sum of the lengths of the ordered MAC SDUs and subheaders is 99 bytes, and the last LF is 1 byte long, the absence of the last LF makes the sum 98 bytes. When there is no other additional data to be transmitted in place of the last LF, the 2 bytes are empty and thus a required padding size is 2 bytes. Thus, the required padding size (2 bytes) exceeds the length of the last LF (1 byte).

In this case, the required padding size is re-calculated, taking into account the inclusion of the last LF and a MAC header is generated to include a padding header according to the re-calculated padding size.

The sum of the lengths of the SDUs and the subheaders including the last LF is 99 bytes in the above example. Then the re-calculated padding size is 1 byte. Eventually, the final required padding size is determined to be 1 byte and a MAC PDU is configured to include a MAC header with a padding header according to the final padding size.

Regarding the second result in which the required padding size is equal to or less than the length of the last LF, if a TB is 100 bytes, the size of transmission data including a MAC header and Payloads is 100 bytes, the last LF is 2 bytes, and data to be delivered in place of the last LF is 1 byte, the required padding size is 1 byte when it is assumed that the last LF is absent. That is, the required padding size is equal to or less than the length of the last LF.

As described before, the first and second exemplary embodiments of PDU generation are available to the above case. A selection between them depends on system implementation.

The first exemplary embodiment of PDU generation is characterized in that a MAC PDU is configured to include the last LF without padding. In the above example, a MAC PDU is configured with 100 bytes of the MAC header and Payloads due to the inclusion of the last LF. As will be described in more detail with reference to FIG. 5D, there are five specific cases for MAC PDU generation in such a situation.

Meanwhile, a MAC PDU is generated by padding without the last LF. One thing to note herein is that the padding without the last LF is indicated to the receiver by setting an R field to a certain value in order to overcome the contradiction faced by the conventional technology. For reference, the R field is a field which is defined as one of the fields of the MAC header but of which the usage is not yet specified in the 3GPP standard. In another exemplary implementation, rather than using the R field, a specific indicator can be inserted into the MAC header for the same purpose.

For example, if the last LF is 2 bytes and 1-byte of data is to be added, the absence of the last LF and addition of the 1-byte of data results in a 1-byte space. This 1-byte space is filled with a padding subheader. In this case, an R field in the last existing subheader before the padding subheader is set to an appropriate value indicating a total padding size including the length of the padding subheader.

Exemplary embodiments of the present invention define the R field to indicate "a MAC PDU is attached with a padding header without the last LF" and a number of bits of the R field can indicate a padding size. This is possible because the padding size is equal to or less than the length of the last LF. For instance, the padding size can be expressed using two bits of the 1-byte R field.

Figure 2A:
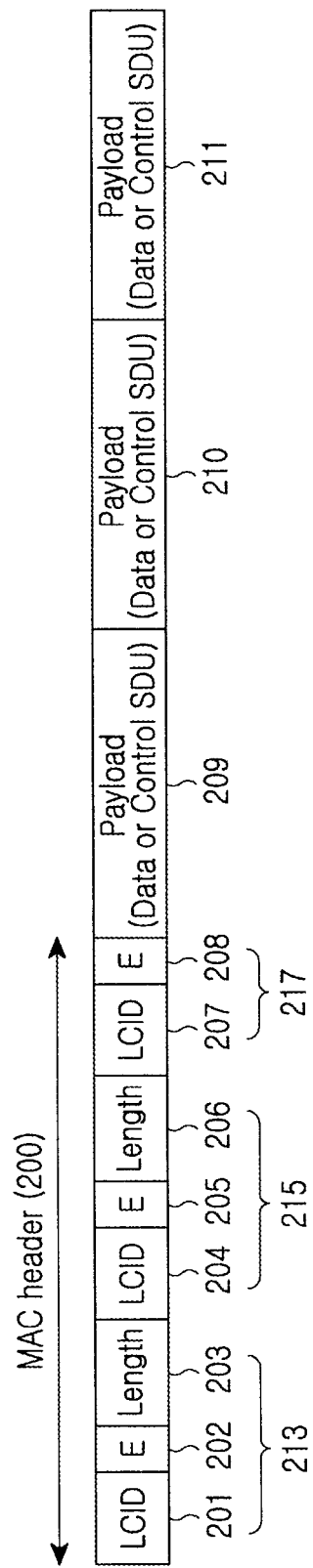
FIG. 2A illustrates a MAC PDU format in a conventional mobile communication system.
Figure 2B:
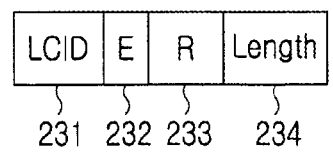
FIG. 2B illustrates a MAC header format according to an exemplary embodiment of the present invention.

The structure of a MAC header with an R field according to an exemplary embodiment of the present invention is illustrated in FIG. 2B.

FIG. 2B illustrates a format of a MAC header with an R field according to an exemplary embodiment of the present invention. Referring to FIG. 2B, the MAC header includes fields for an LCID 231, an E 232, an R 233, and a Length (i.e. LF) 234.

Figure 3:
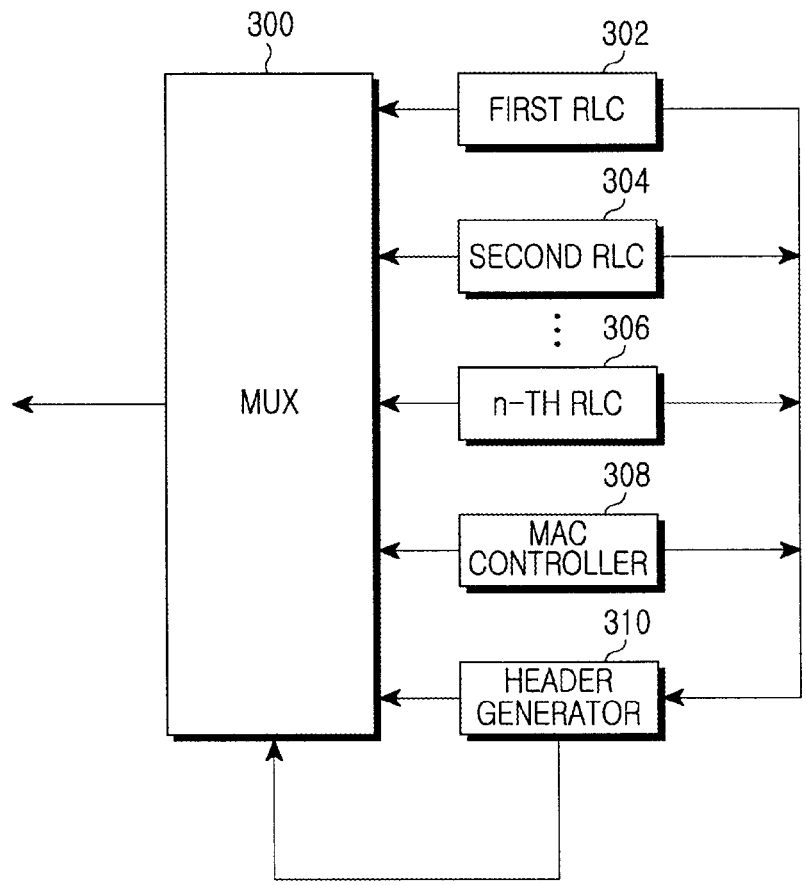
FIG. 3 is a block diagram of a MAC PDU generator in a transmitter in a mobile communication system according to an exemplary embodiment of the present invention.
Figure 4:
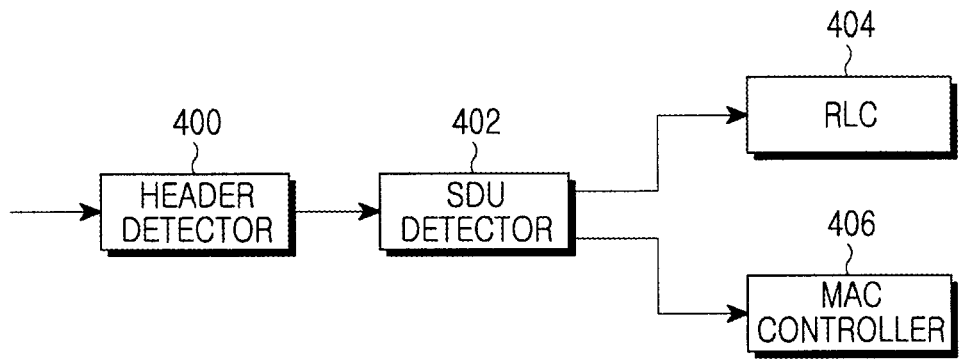
FIG. 4 is a block diagram of a MAC PDU receiver in a receiver in a mobile communication system according to an exemplary embodiment of the present invention.

With reference to FIGS. 3 and 4, apparatuses according to exemplary embodiments of the present invention will be described.

FIG. 3 is a block diagram of a MAC PDU generator in a transmitter in a mobile communication system according to an exemplary embodiment of the present invention.

Referring to FIG. 3, the MAC PDU generator includes a Multiplexer (MUX) 300, RLC entities 302, 304 and 306, a MAC controller 308, and a header generator 310.

The RLC entities 302, 304 and 306 transmit their MAC SDUs to the MUX 300 and their LCIDs and LF values related to the MAC SDUs to the header generator 310.

In the presence of a MAC SDU carrying a control signal for a MAC protocol control, the MAC controller 308 transmits the control MAC SDU to the MUX 300 and provides an LCID and an LF value related to the control MAC SDU to the header generator 310.

The lengths of the LFs can be set in different manners according to exemplary embodiments of the present invention. To be more specific, in the first exemplary embodiment the LFs are of the same length and the subheaders and MAC SDUs are ordered. In the second exemplary embodiment, the LFs have different lengths depending on logical channels associated with them. In the third exemplary embodiment, the LFs are of a minimum length required to express a TB size.

The header generator 310 generates a MAC header with the LCIDs and LF values received from the RLC entities 302, 304 and 306 and the MAC controller 308. The header generator 310 provides the MAC header to the MUX 300, and controls the order of the MAC SDUs through the MUX 300.

To be more specific, the header generator 310 can control the MUX 300 to order the MAC SDUs randomly according to the first exemplary embodiment of SDU ordering, and to order the MAC SDUs so that a MAC SDU corresponding to the longest LF is in the last Payload according to the second or third exemplary embodiment of SDU ordering. Also, the header generator 310 generates the MAC header by concatenating subheaders according to the order of the MAC SDUs and provides it to the MUX 300.

As stated before, MAC PDU generation depends on whether a padding size required for configuring the MAC PDU exceeds the length of the last LF, or is equal to or less than the length of the last LF.

If the required padding size is larger than the length of the last LF, the required padding size is re-calculated, taking into account of the inclusion of the last LF and a MAC PDU is configured according to the re-calculated padding size.

On the other hand, if the required padding size is equal to or less than the length of the last LF, the afore-described first or second exemplary embodiments of PDU generation are used.

The MUX 300 multiplexes the MAC header and the MAC SDUs according to a MAC SDU order that is determined according to which of the exemplary embodiments of the present invention is used and provides the resulting MAC PDU to a PHY layer.

FIG. 4 is a block diagram of a MAC PDU receiver in a mobile communication system according to an exemplary embodiment of the present invention.

Referring to FIG. 4, the MAC PDU receiver includes a header detector 400, an SDU detector 402, an RLC entity 404, and a MAC controller 406.

The header detector 400 detects LCIDs and lengths of MAC SDUs multiplexed in a received MAC PDU from the MAC header of the MAC PDU. The lengths of the MAC SDUs are known from the LFs of the MAC header.

Again, LFs are of the same length in the first exemplary embodiment. LFs have different lengths depending on logical channels associated with them and a subheader with the longest LF is positioned at the end of a MAC header in the second exemplary embodiment of the present invention. In the third exemplary embodiment of the present invention, LFs are of a minimum length required to express a TB size.

The received MAC PDU includes a padding of a size which was re-calculated, taking into account the inclusion of the last LF, if a required padding size calculated by assuming the absence of the last LF exceeds the length of the last LF. If the required padding size is equal to or less than the length of the last LF, the received MAC PDU includes the last LF in accordance with the first exemplary embodiment of PDU generation, and includes padding and an R field without the last LF in accordance with the second exemplary embodiment of PDU generation.

The SDU detector 402 extracts the MAC SDUs from the MAC PDU based on information about the LCIDs and lengths of the MAC SDUs received from the header detector 400 and provides data MAC SDUs to the RLC entity 404 and control MAC SDUs to the MAC controller 406. The data MAC SDUs and the control MAC SDUs can be identified by their LCIDs. This operation will be described in more detailed later with reference to FIGS. 6A to 6H.

Now a description will be made of MAC PDU generation in a transmitter according to exemplary embodiments of the present invention.

Figure 5A:
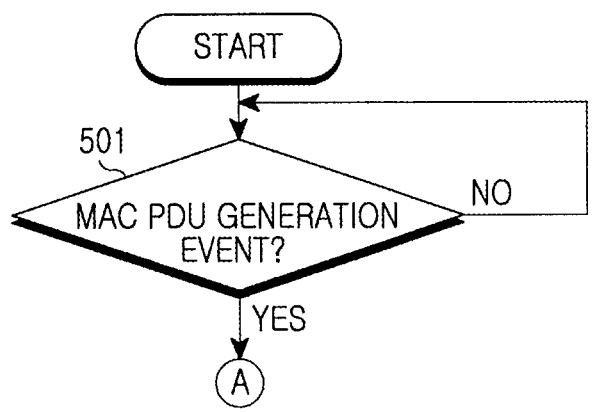
FIGS. 5A to 5E are flowcharts illustrating operations for generating a MAC PDU with a MAC header in a transmitter of a mobile communication system according to exemplary embodiments of the present inventions.
Figure 5B:
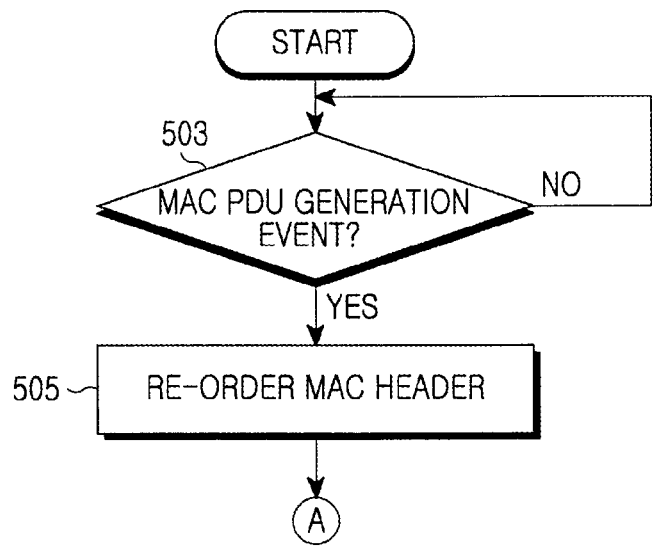
Figure 5C:
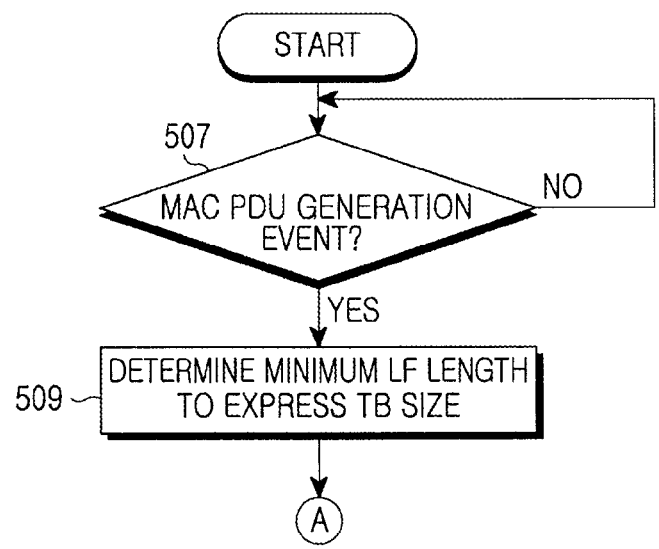
Figure 5D:
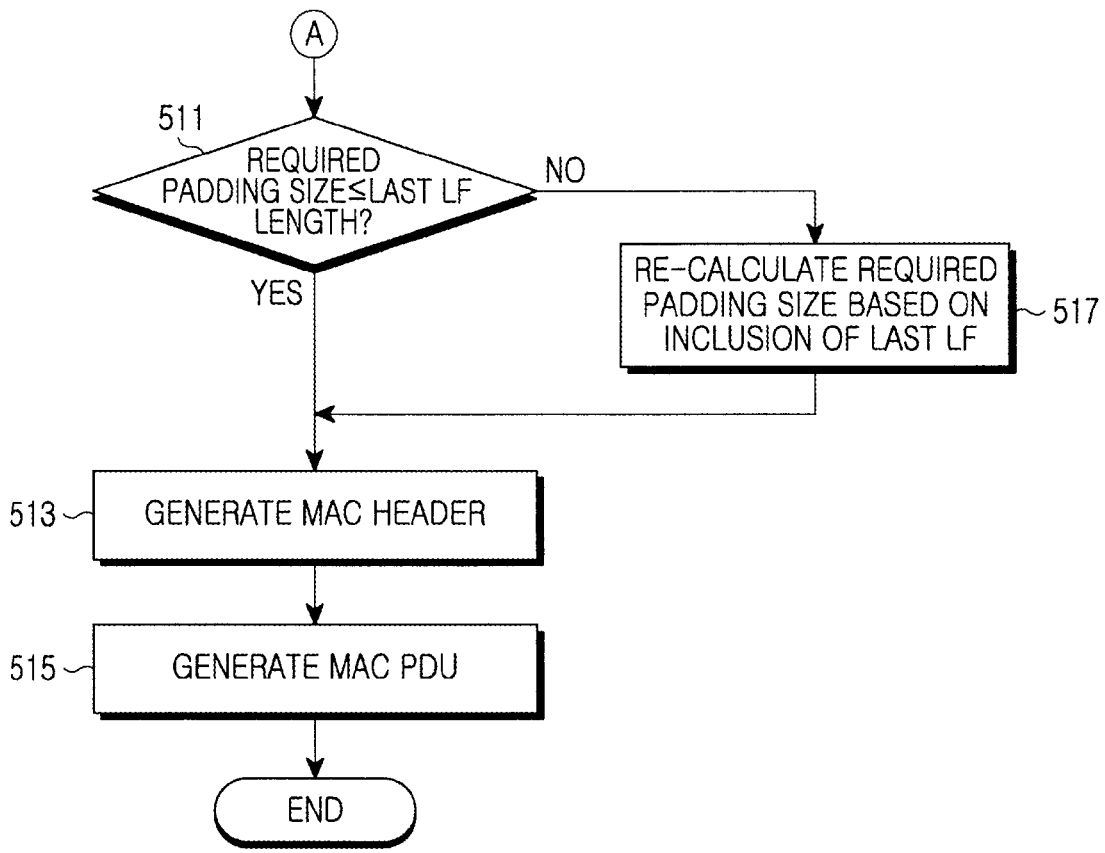
Figure 5E:
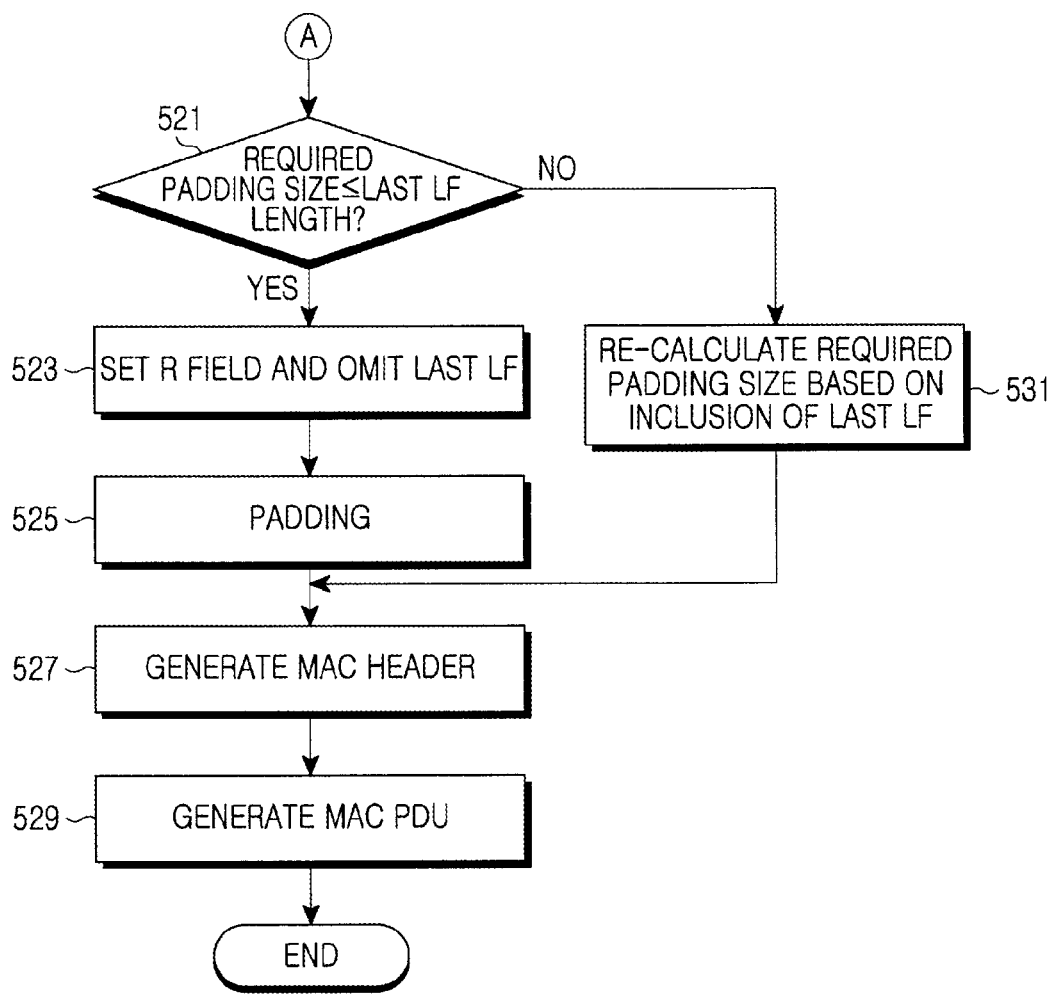

FIGS. 5A to 5E are flowcharts illustrating MAC PDU generation operations of a transmitter in a mobile communication system according to exemplary embodiments of the present invention. Specifically, FIGS. 5A, 5B and 5C illustrate SDU orderings according to the first, second and third exemplary embodiments of SDU ordering, respectively and FIGS. 5D and 5E illustrate operations for generating a MAC header and configuring a MAC PDU according to the first and second exemplary embodiments of PDU generation, respectively after the operations illustrated in FIGS. 5A, 5B and 5C.

Referring to FIG. 5A depicting the first exemplary embodiment of SDU ordering, upon detection of the occurrence of a MAC PDU generation event in step 501, the transmitter proceeds to the procedure of FIG. 5D or 5E, taking into account a MAC header format having a fixed LF length without any separate processing of a MAC header.

Referring to FIG. 5B depicting the second exemplary embodiment of SDU ordering, upon detection of the occurrence of a MAC PDU generation event in step 503, the transmitter determines an LF length for each logical channel and orders a subheader with the longest LF at the end of a MAC header and a MAC SDU described by the subheader in the last Payload in step 505. Then the transmitter proceeds to the procedure of FIG. 5D or 5E.

Referring to FIG. 5C depicting the third exemplary embodiment of SDU ordering, upon detection of the occurrence of a MAC PDU generation event in step 507, the transmitter determines a minimum LF length required to express a TB size for each logical channel and orders a subheader with the longest LF at the end of a MAC header and a MAC SDU described by the subheader in the last Payload in step 509. Then the transmitter proceeds to the procedure of FIG. 5D or 5E.

Referring to FIG. 5D, the transmitter determines whether a padding size required for configuring a MAC PDU is equal to or less than the length of the last LF in step 511, after the SDU ordering operation according to the first, second or third exemplary embodiment. If the required padding size is larger than the length of the last LF, the transmitter proceeds to step 517.

In step 517, the transmitter re-calculates the required padding size, taking into account the inclusion of the last LF. Then the transmitter configures a MAC header including a padding header according to the re-calculated padding size in step 513.

On the other hand, if the padding size is determined to be equal to or less than the length of the last LF in step 511, the transmitter configures a MAC header including the last LF according to the first exemplary embodiment of PDU generation in step 513. In step 515, the transmitter generates a MAC PDU by multiplexing the MAC header with at least one MAC SDU to be transmitted.

The following five cases can be contemplated according to the first exemplary embodiment of PDU generation.

Case 1: The MAC PDU is generated with the last LF included, without padding.

Case 2: In the presence of extra reserved bits in the MAC header, the MAC PDU includes the last LF, with the extra reserved bits set to a value indicating the inclusion of the last LF.

Case 3: The MAC PDU includes the last LF and the E field corresponding to the last MAC SDU being set to '1' indicating the inclusion of the last LF. This E field setting has a different meaning from the conventional E field setting described earlier with reference to FIG. 2A.

Case 4: The MAC PDU includes the last LF set to a pattern indicating the inclusion of the last LF. For instance, the last LF is set to all 0 s to indicate the existence of the last LF.

Case 5: The MAC PDU includes the last LF set to a pattern indicating the inclusion of the last LF and the E field corresponding to the last MAC SDU set to '1'. Case 5 is a combination of Case 3 and Case 4.

In Case 4 and Case 5, the pattern of the last LF means that the last LF is set to all 0 s. That is, if the last LF is 7 bits long, it can be '0000 000' and if the last LF is 15 bits long, it can be '0000 0000 0000 000'. Of course, the pattern can be any other value by prior agreement.

Referring to FIG. 5E, the transmitter determines whether the padding size required for configuring a MAC PDU is equal to or less than the length of the last LF in step 521, after the SDU ordering operation according to the first, second or third exemplary embodiment of SDU ordering. If the required padding size is larger than the length of the LF size, the transmitter proceeds to step 531.

In step 531, the transmitter re-calculates the required padding size, taking into account the inclusion of the last LF. Then the transmitter configures a MAC header including the last LF and a padding header based on the re-calculated padding size in step 527.

On the other hand, if it is determined that the required padding size is equal to or less than the length of the last LF in step 521, the transmitter configures a MAC header including an R field without the last LF in step 523. The R field is set to indicate that "the last LF is not included but a padding header is added" and its value indicates the padding size. In step 525, the transmitter pads a MAC PDU. Then the transmitter generates the MAC header including the padding header without the last LF in step 527. Steps 523 to 527 are based on the second exemplary embodiment of PDU generation. In step 529, the transmitter generates the MAC PDU by multiplexing the MAC header with at least one MAC SDU to be transmitted.

MAC PDU reception at a receiver according to an exemplary embodiment of the invention will now be described.

Reception of the MAC PDU involves header checking for determining LF lengths and SDU parsing for determining whether the last LF is included and parsing MAC SDUs accordingly.

In the header checking step, LCIDs and the lengths of LFs are determined in the MAC header of a received MAC PDU. To determine the lengths of LFs, the receiver operates in correspondence with the first, second or third exemplary embodiment of SDU ordering of the transmitter. For sake of convenience, the operations corresponding to the first, second and third exemplary embodiments of SDU ordering are referred to as first, second and third exemplary embodiments of header checking.

The SDU parsing is the counterpart of the PDU generation operation of the transmitter. The present invention proposes five exemplary embodiments for determining whether the last LF is included during the SDU parsing. These five exemplary embodiments are referred to as first to fifth exemplary embodiments of SDU parsing.

According to exemplary embodiments of the present invention, to determine whether the last LF is included or not in a MAC PDU, the length of the MAC PDU is determined based on the assumption that the last LF is included. If the MAC PDU length is equal to a known TB size, the receiver determines that the last LF is included. If they have different lengths, the receiver determines that the last LF is not included.

Notably, the second exemplary embodiment of SDU parsing corresponds to the second exemplary embodiment of PDU generation, in which it can be determined from an R field of a MAC PDU whether the last LF is included in the MAC PDU.

FIGS. 6A to 6H are flowcharts illustrating MAC SDU detection operations of a receiver in a mobile communication system according to exemplary embodiments of the present invention.

Figure 6A:
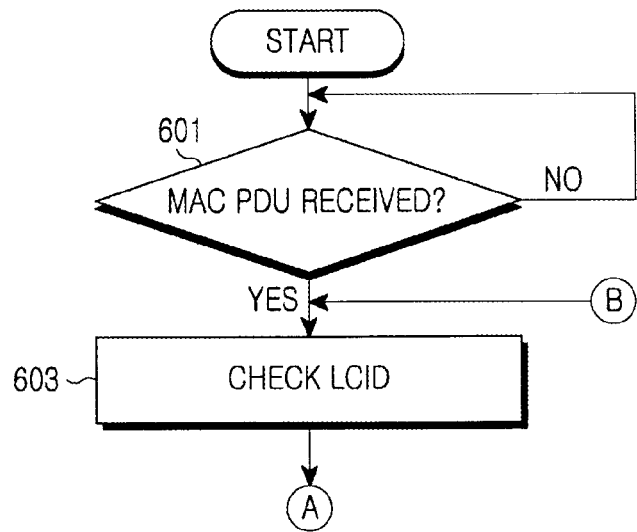
FIGS. 6A to 6H are flowcharts illustrating operations for detecting a MAC header and MAC SDUs from a MAC PDU in a receiver of a mobile communication system according to exemplary embodiments of the present inventions.
Figure 6B:
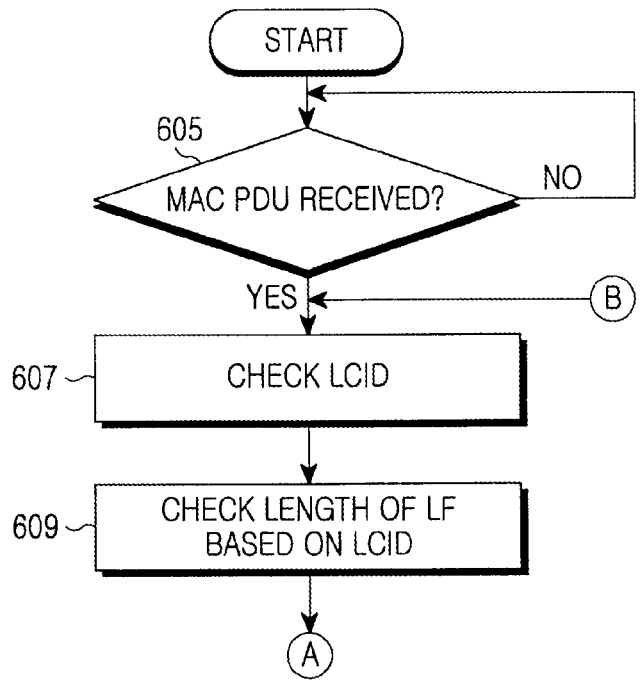
Figure 6C:
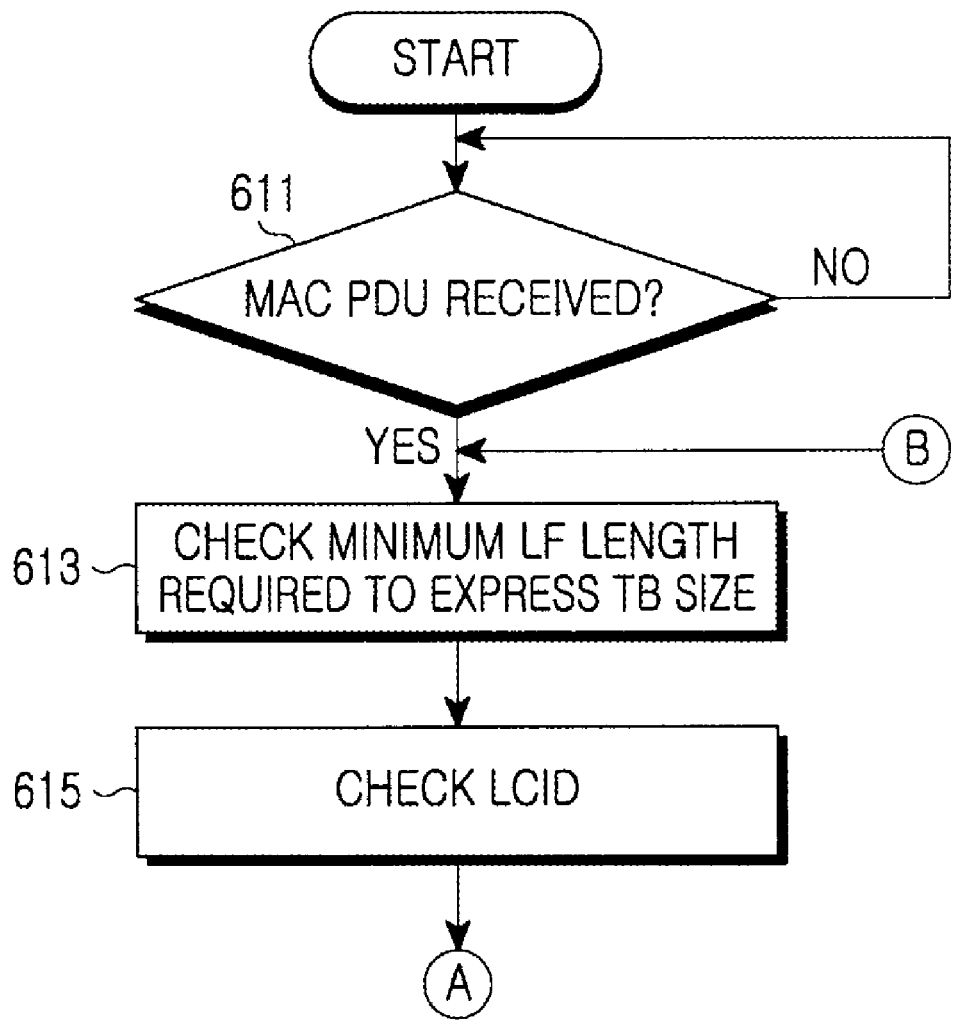

FIGS. 6A, 6B and 6C illustrate reception operations which are counterparts of the operations illustrated in FIGS. 5A, 5B and 5C, that is, the first, second and third exemplary embodiments of header checking, respectively.

Figure 6D:
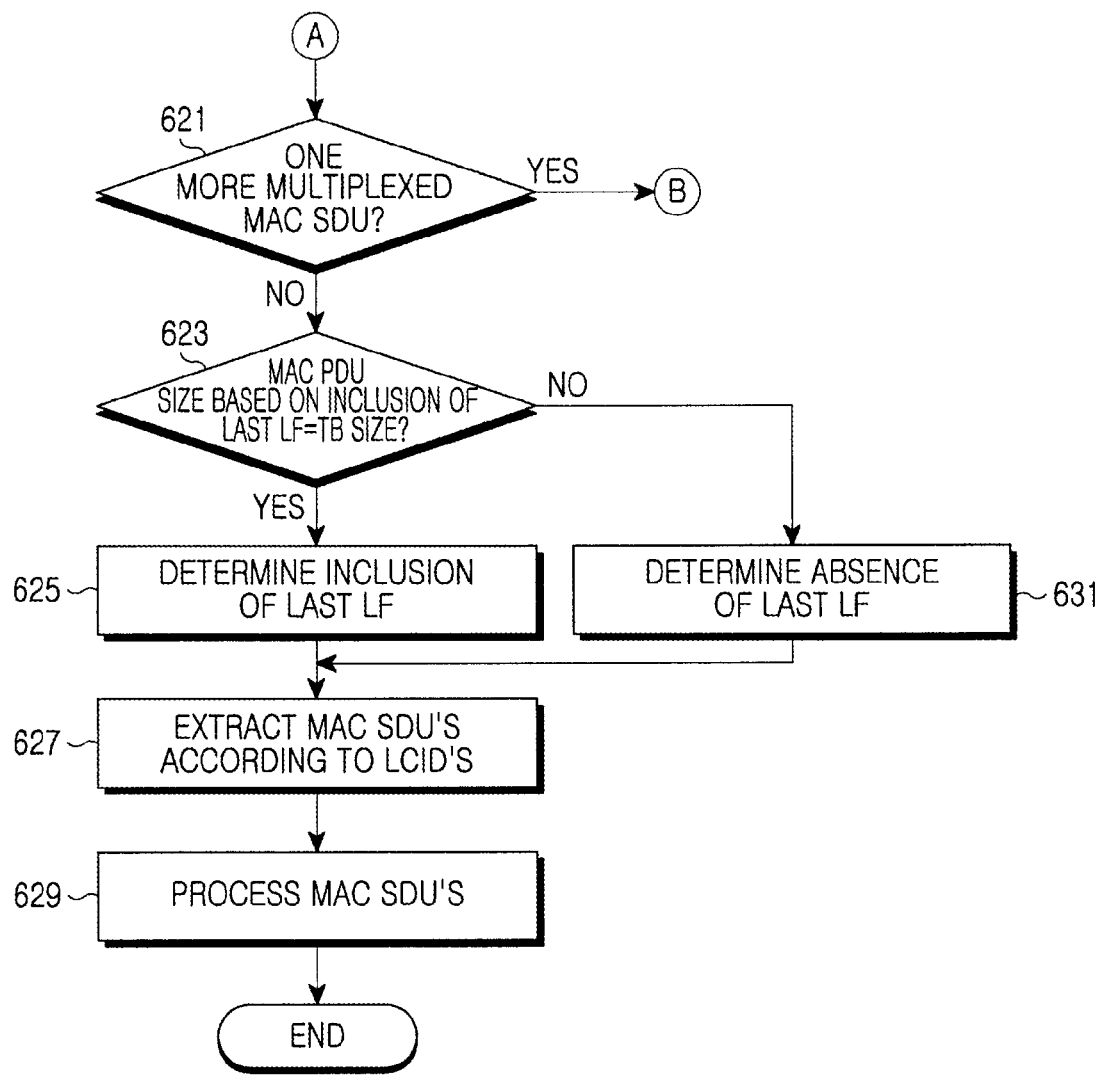
Figure 6E:
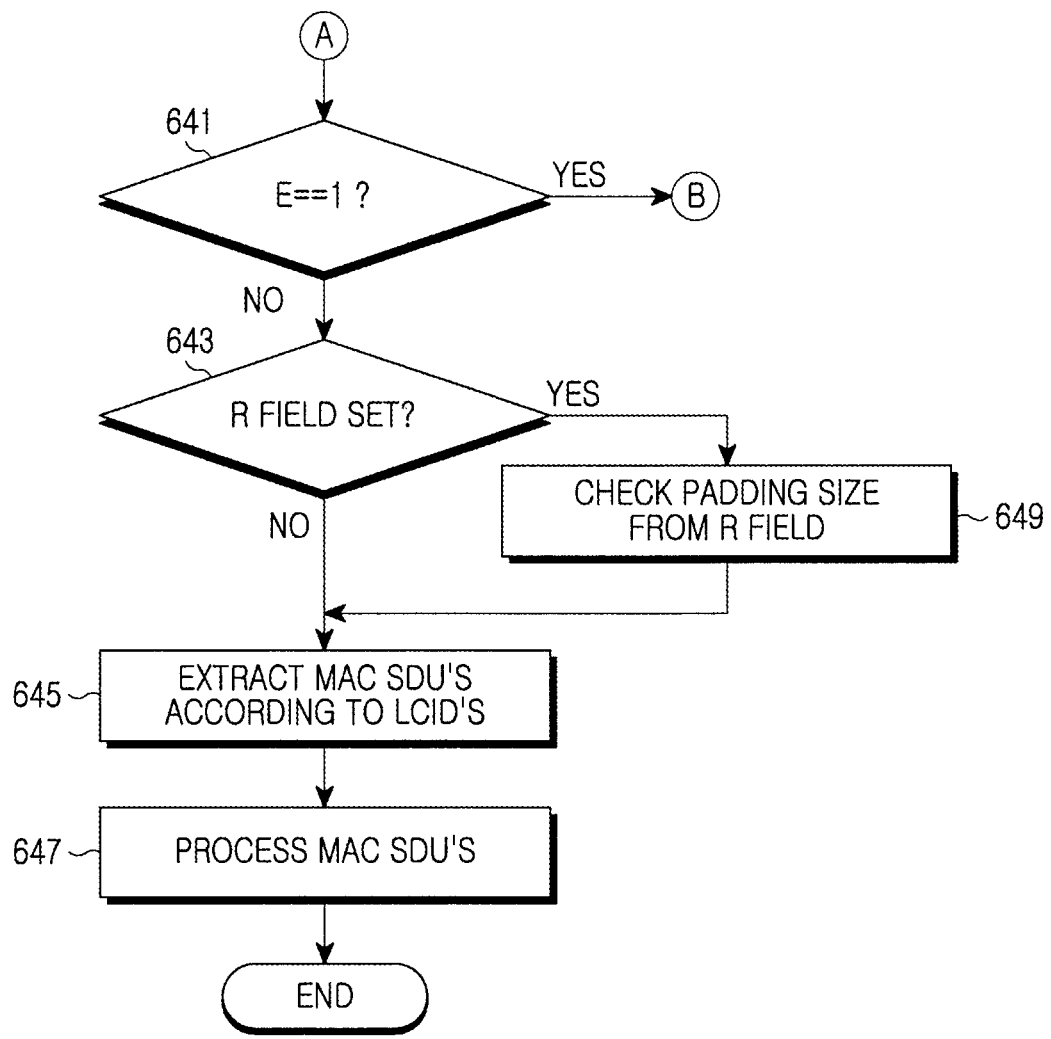
Figure 6F:
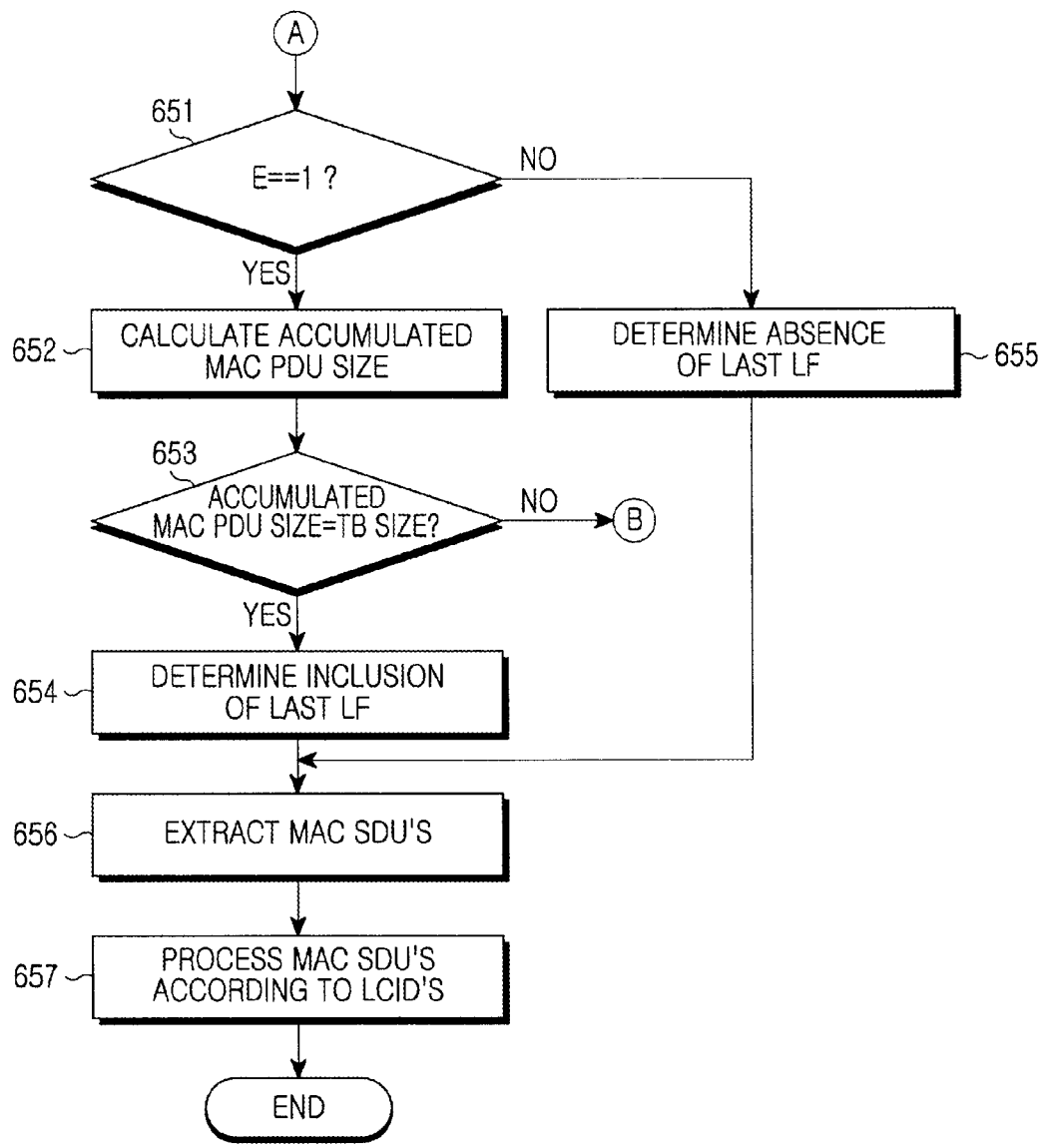
Figure 6G:
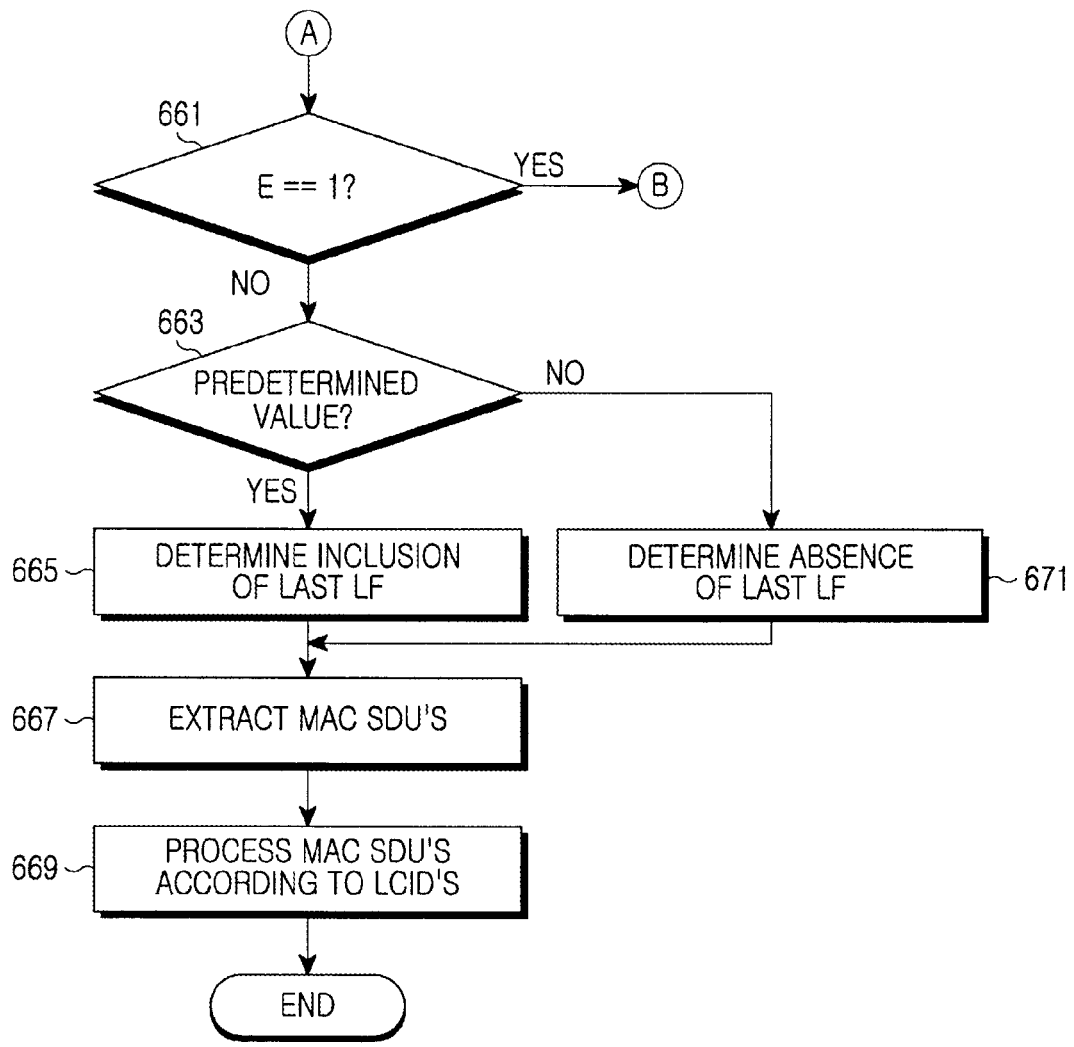
Figure 6H:
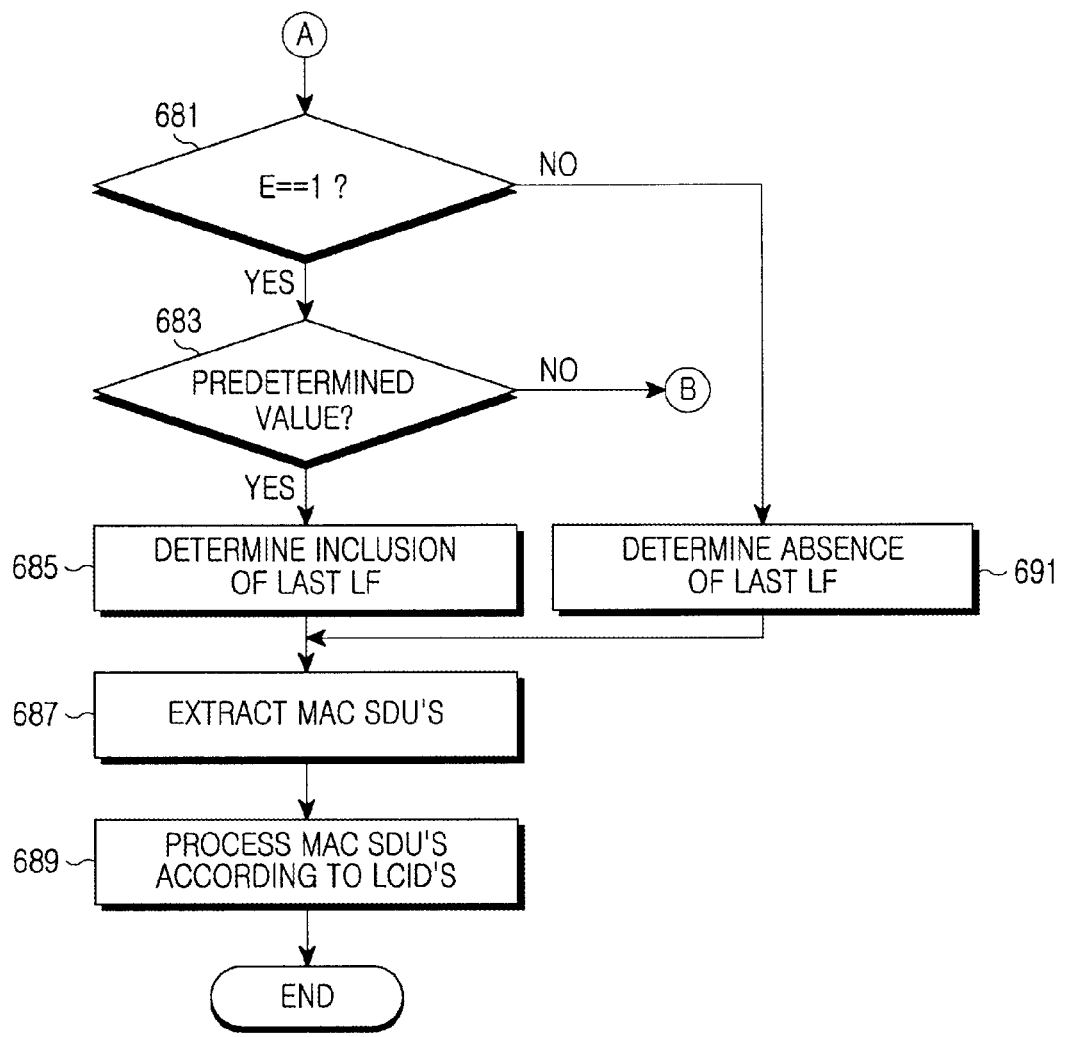

FIG. 6E illustrates a reception operation being the counterpart of FIG. 5E. FIG. 6D illustrates reception operations being the counterparts of Case 1 and Case 2 illustrated in FIG. 5D, FIG. 6F illustrates a reception operation being the counterpart of Case 3 illustrated in FIG. 5D, and FIGS. 6G and 6H illustrate reception operations being the counterpart of Case 4 and Case 5, respectively. The reception operations illustrated in FIGS. 6E to 6H are based on the first to fifth exemplary embodiments of SDU parsing.

Referring to FIG. 6A depicting the first exemplary embodiment of header checking, the receiver receives a MAC PDU in step 601 and checks LCIDs and a fixed LF length in the MAC header of the MAC PDU in step 603. Then the receiver proceeds to the procedure illustrated in one of FIGS. 6D to 6H.

Referring to FIG. 6B depicting the second exemplary embodiment of header checking, the receiver receives a MAC PDU in step 605, checks LCIDs in the MAC header of the MAC PDU in step 607, and checks predetermined LF lengths according to the LCIDs in step 609. Then the receiver proceeds to the procedure illustrated in one of FIGS. 6D to 6H.

Referring to FIG. 6C depicting the third exemplary embodiment of header checking, the receiver receives a MAC PDU in step 611, checks LF lengths set to a minimum value required to express a TB size in the MAC header of the MAC PDU in step 613, and checks LCIDs in the MAC header in step 615. Then the receiver proceeds to the procedure illustrated in one of FIGS. 6D to 6H.

Referring to FIG. 6D depicting the first exemplary embodiment of SDU parsing corresponding to Case 1 and Case 2 according to the first exemplary embodiment of PDU generation, the receiver determines whether there is another multiplexed MAC SDU that is yet to be identified in the MAC PDU in step 621. In the presence of the MAC SDU, the receiver proceeds to the procedure illustrated in one of FIGS. 6A, 6B and 6C, as indicated by reference character B, which it repeats until it checks subheaders about all MAC SDUs in the MAC header. After having completed the checking of the subheaders about all MAC SDUs in step 621, the receiver proceeds to step 623.

In step 623, the receiver calculates the lengths of the MAC SDUs using the values of all LFs in the MAC header, assuming that the last LF is included in the MAC PDU, and calculates the total size of the MAC PDU based on the lengths of the MAC SDUs. The sum of the values of all the LFs is that of the lengths of the MAC SDUs and the length of the MAC header is known from the lengths of the LFs. Then the receiver compares the size of the MAC PDU with a known TB size.

If the MAC PDU size is equal to the TB size, the receiver determines that the MAC PDU includes the last LF in step 625 and extracts the individual MAC SDUs from the MAC PDU using the LFs in step 627. In step 629, the receiver processes the extracted MAC SDUs according to their LCIDs.

On the other hand, if it is determined that the MAC PDU size is different from the TB size in step 623, the receiver determines that the MAC PDU does not include the last LF in step 631. The reason for the two values being different is that in spite of the omission of the last LF, the LFs have been checked on the assumption that the last LF is included. In step 627, the receiver extracts MAC SDUs using the LFs, and extracts a MAC SDU corresponding to the omitted LF by calculating the length of the MAC SDU based on the values of the existing LFs and the TB size. The receiver then processes the MAC SDUs according to their LCIDs in step 629. If the last LF is not included, it is determined that the remainder of the Payloads of the MAC PDU following the previous extracted MAC SDUs belongs to the last MAC SDU.

Referring to FIG. 6E depicting the second exemplary embodiment of SDU parsing corresponding to FIG. 5E illustrating the second exemplary embodiment of PDU generation, the receiver determines whether an E field for a MAC SDU is set to '1' in step 641. If the E field is '1', the receiver determines that there is one more multiplexed MAC SDU in the received MAC PDU and proceeds to the procedure illustrated in one of FIGS. 6A, 6B and 6C, as indicated by reference character B, which it repeats until it checks subheaders of all MAC SDUs, defined in the MAC header.

If the E field is set to '0', which implies that there is no more multiplexed MAC SDU following the MAC SDU, the receiver proceeds to step 643 to decide as to whether the MAC header includes the last LF or not.

In step 643, the receiver determines whether an R field (or another indictor) is set. As stated before, the R field indicates that "a MAC PD does not include the last LF but includes padding", if the required padding size exceeds the length of the last LF. Therefore, if the R field is set, the receiver determines a padding size from the value of the R field in step 649.

The receiver extracts the MAC SDUs from the MAC PDU, taking into account the values of the LFs, the padding size, and the TB size in step 645 and processes the MAC SDUs according to their LCIDs in step 647.

Alternatively, if it is determined that the R field is not set, that is, if the R field is a default value of all '0's, for example, the receiver extracts the MAC SDUs from the MAC PDU, taking into account the values of the LFs in step 645 without step 649 and processes the MAC SDUs according to their LCIDs in step 647.

Referring to FIG. 6F depicting the third exemplary embodiment of SDU parsing corresponding to Case 3 of FIG. 5D according to the first exemplary embodiment of PDU generation, if an E field for a MAC SDU is set to '1', the receiver determines that an LF exists for the MAC SDU in step 651 and calculates the size of the MAC SDU using the LF in step 652. If there is a previous accumulated size of the MAC PDU, the receiver updates the accumulated size by adding the calculated MAC SDU size and the size of the MAC header to the previous accumulated size.

In step 653, the receiver compares the updated accumulated size with a known TB size. If it is determined that the accumulated size is equal to the TB size, the receiver determines that the last LF is included in the MAC PDU in step 654 and extracts the MAC SDUs from the MAC PDU using the values of the LFs in step 656. In step 657, the receiver processes the MAC SDUs according to their LCIDs. On the other hand, if it is determined that the accumulated size is different from the TB size, the receiver returns to the procedure illustrated in one of FIGS. 6A, 6B and 6C, as indicated by reference character B.

If it is determined that the E field for the MAC SDU is '0' in step 651, the receiver determines that an LF is not included for the MAC SDU and the remainder of the MAC PDU, except for the previous identified MAC SDUs, belongs to the last MAC SDU in step 655, extracts the MAC SDUs from the MAC PDU using their LFs in step 656. In step 657, the receiver processes the MAC SDUs according to their LCIDs. When the MAC PDU reception is completed, the accumulated size is reset to update an accumulated size for the next MAC PDU.

Referring to FIG. 6G depicting the fourth exemplary embodiment of SDU parsing corresponding to Case 4 of FIG. 5D according to the first exemplary embodiment of PDU generation, if an E field for a MAC SDU is set to '0', the receiver determines that a MAC SDU corresponding to the E field is the last MAC PDU and checks whether an LF following the E field is set to a predetermined pattern in step 663. If the LF has the predetermined pattern, the receiver determines that a padding size required for MAC PDU generation is equal to or less than the length of the last LF and thus the transmitter transmitted the last LF set to the predetermined value. In an exemplary implementation, if the last LF is 7 bits long, the predetermined pattern can be '0000 000'.

The receiver determines that the last LF is included in the MAC PDU in step 665, extracts the MAC SDUs from the MAC PDU using the LFs for the MAC SDUs in step 667, and processes the MAC SDUs according to their LCIDs in step 669 (reception in correspondence with Case 4 of FIG. 5D).

On the other hand, if the LF value is different from the predetermined pattern, the receiver determines that the last LF is not included in the MAC PDU in step 671, extracts the MAC SDUs from the MAC PDU using the LFs for the MAC SDUs in step 667, and processes the MAC SDUs according to their LCIDs in step 669. In this case, the last MAC SDU is determined to occupy the remainder following the previous extracted MAC SDUs in the Payloads of the MAC PDU.

If it is determined that the E field for the MAC SDU is '1' in step 661, the receiver returns to the procedure illustrated in one of FIGS. 6A, 6B and 6C as indicated by reference character B, which it repeats until it checks subheaders about all MAC SDUs in the MAC header.

Referring to FIG. 6H depicting the fifth exemplary embodiment of SDU parsing corresponding to Case 5 of FIG. 5D according to the first exemplary embodiment of PDU generation, if an E field for a MAC SDU is set to '1', the receiver determines that an LF exists for the MAC SDU in step 681 and checks the pattern of the LF in step 683. If the LF value is identical to a predetermined pattern, the receiver determines that a padding size required for MAC PDU generation is equal to or less than the length of the last LF and the transmitter set the E field to '1' and the LF for the MAC SDU to the pattern in order to indicate the existence of the LF for the MAC SDU.

Thus, the receiver determines that the last LF is included in the MAC PDU in step 685, extracts MAC SDUs from the MAC PDU using the LFs for the MAC SDUs in step 687, and processes the MAC SDUs according to their LCIDs in step 689 (reception in correspondence with Case 5 of FIG. 5D).

On the other hand, if it is determined that the LF pattern is different from the predetermined pattern, the receiver checks LFs for use in MAC SDU extraction in step 687 and returns to the procedure illustrated in one of FIGS. 6A, 6B and 6C as indicted by reference character B, which it repeats until it checks subheaders about all MAC SDUs in the MAC header.

If it is determined that the E field for the MAC SDU is '0' in step 681, the receiver determines that an LF is not included for the MAC SDU in step 691, extracts MAC SDUs from the MAC PDU using the LFs for the MAC SDUs in step 687, and processes the MAC SDUs according to their LCIDs in step 689. If the last LF is not included, the last MAC SDU is determined to occupy the remainder following the previous extracted MAC SDUs in the Payloads of the MAC PDU.

Embodiment 2

Figure 7:
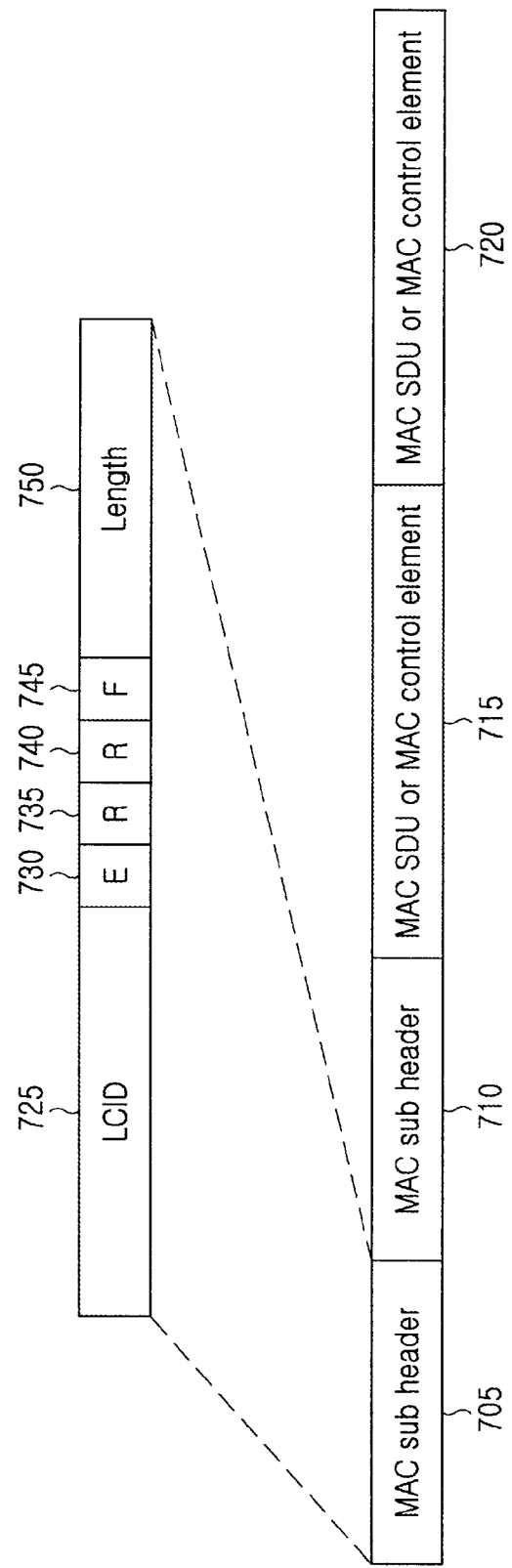
FIG. 7 illustrates a MAC PDU format according to an exemplary embodiment of the present invention.

FIG. 7 illustrates a MAC PDU format according to an exemplary embodiment of the present invention.

Referring to FIG. 7, a MAC PDU includes a plurality of MAC subheaders 705 and 710 and a plurality of Payloads 715 and 720 carrying a plurality of MAC SDUs or a plurality of pieces of MAC control information.

Each MAC subheader 705 or 710 provides multiplexing information about a MAC SDU or MAC control information 715 or 720. The MAC PDU has as many MAC subheaders as the number of Payloads. The mapping relationship between the MAC subheaders 705 and 710 and the Payloads 715 and 720 depends on the order of the Payloads 715 and 720. For example, the first and second MAC subheaders 705 and 710 describe the first and second Payloads 715 and 720, respectively.

Each MAC subheader includes an LCID 725, an E 730, a Flag (F) 745, a Length (i.e. an LF) 750, and Rs 735 and 740. The LCID 725 provides the ID of a logical channel that delivers a MAC SDU corresponding to the LCID 725 or indicates the type of MAC control information corresponding to the LCID 725. The E 730 indicates whether the MAC subheader is the last one and the LF 745 indicates the length of the MAC SDU or the MAC control information. To reduce the processing load of the transmitter and the receiver, the MAC subheaders 705 and 710 are byte-aligned and for this purpose, 2-bit R fields 735 and 740 are used. The LF 750 is 7 or 15 bits and the preceding F field 745 indicates the length of the LF 750. For example, if the F field 745 is set to 0, the LF 750 is 7 bits and if the F field 745 is set to 1, the LF 750 is 15 bits. When it is 7 bits, the LF 750 can express a length of up to 127 bytes and when it is 15 bits, the LF 750 can express a length of up to 32768 bytes.

As illustrated in FIG. 7, the length of a MAC subheader is 1, 2 or 3 bytes. Because LF and F fields are not included in the last MAC subheader, the length of the last MAC subheader is usually 1 byte. As mentioned before, if the absence of the LF in the last MAC subheader triggers a 1- or 2-byte padding, it is preferred to include the last LF.

It can be generalized that the 1- or 2-byte padding takes place when the required padding size is equal to or less than the sum of the lengths of the LF and F and the 1- or 2-byte padding does not take place when the required padding size is larger than the sum of the lengths of the LF and F. Hereinbelow, for sake of completeness, it is determined whether the required padding size is 1 byte or 2 bytes rather than it being determined whether the required padding size is larger than the sum of the lengths of the LF and the F.

Accordingly, the second exemplary embodiment of the present invention determines the length of the last LF according to whether the size of the padding resulting in eliminating the last LF is 1 byte or 2 bytes. The LF of the last MAC subheader is set to a value indicating that a MAC SDU corresponding to the LF is the last MAC SDU because 2 bytes are available to the last MAC subheader but the length of the last MAC SDU may exceed a maximum value that the LF of the 1-byte MAC subheader can indicate.

For example, in the case where a 1000-byte MAC PDU carries a first 196-byte MAC SDU and a second 800-byte MAC SDU, a 1-byte padding is required because a first MAC subheader is 2 bytes and the elimination of an LF from a second MAC subheader, i.e. the last MAC subheader makes the total size of the MAC PDU 999 bytes. With the LF included in the last MAC subheader, only 7 bits are available to the last LF, even though 15 bits are needed to express the length of 800 bits.

To overcome the above problem, the transmitter and the receiver preliminarily agree on an LF value indicating the last MAC subheader. If the absence of an F and an LF in the last MAC subheader results in a 1- or 2-byte padding, an LF as long as the expected padding size is inserted in the last MAC subheader and the LF is set to the value, so that the receiver can demultiplex MAC SDUs correctly.

Figure 8:
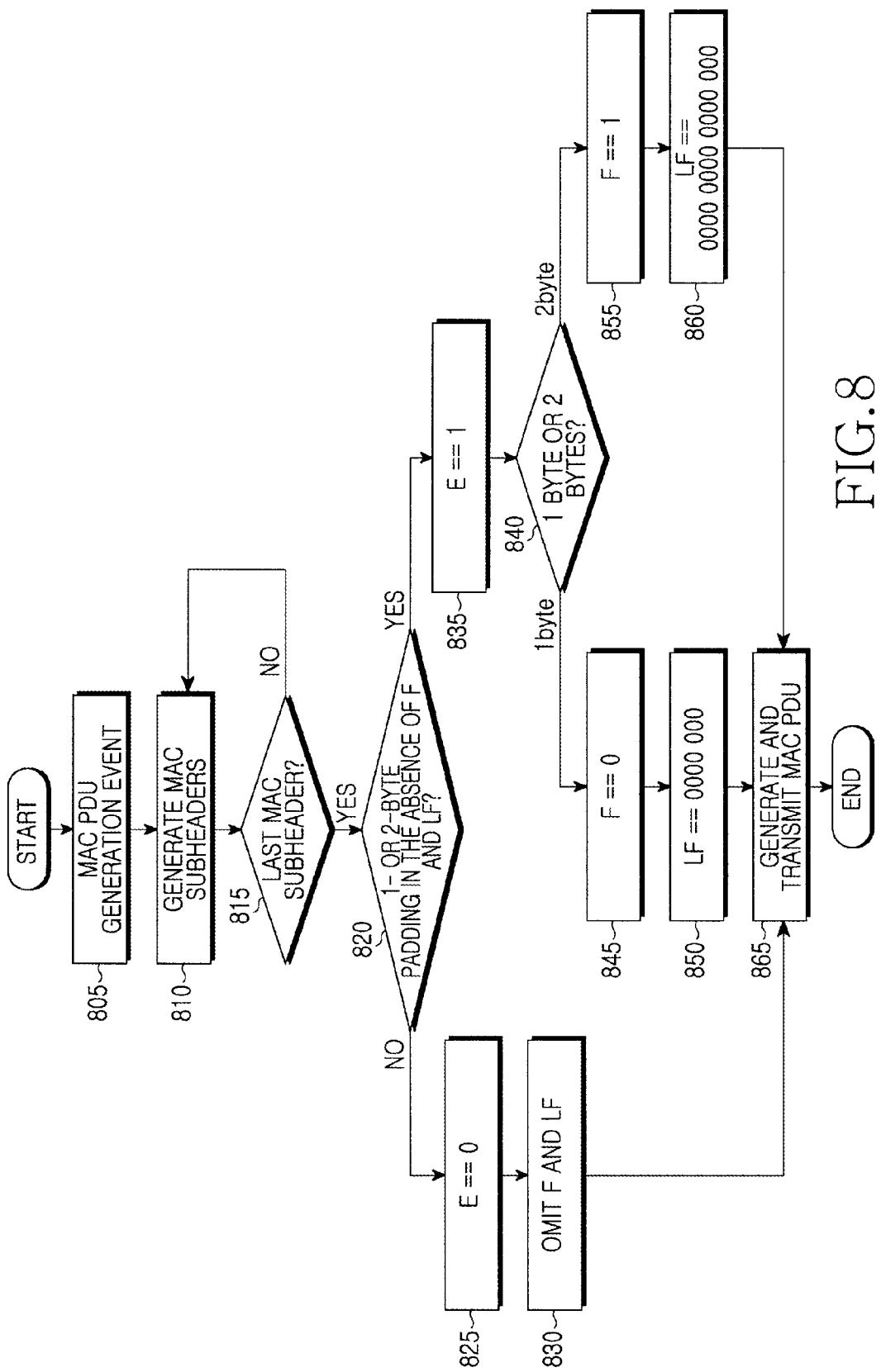
FIG. 8 is a flowchart illustrating a transmission operation according to an exemplary embodiment of the present invention.

FIG. 8 is a flowchart illustrating a transmission operation according to an exemplary embodiment of the present invention.

Referring to FIG. 8, the transmitter senses occurrence of a MAC PDU generation event in step 805. For instance, when a Mobile Station (MS) transmitter receives information about uplink transmission resources and a MAC PDU size from a Base Station (BS) scheduler, it is aware that it is to generate a MAC PDU of the MAC PDU size. In step 810, the transmitter determines logical channels to deliver data, referring to the MAC PDU size and the amount of data buffered in an upper-layer buffer and determines the sizes of MAC SDUs for the respective logical channels. The transmitter generates MAC subheaders except for the last MAC subheader for the respective MAC SDUs in a general manner.

At the time, when it is determined that the transmitter generates the last MAC subheader in step 815, it determines whether the absence of an F and an LF in the last MAC subheader will result in a 1- or 2-byte padding in step 820. If the 1- or 2-byte padding will result, the transmitter proceeds to step 835 and otherwise, it proceeds to step 825. In step 825, the transmitter sets the E field of the last MAC subheader to '0' because it determines that no padding occurs despite the elimination of the F and LF in the last MAC subheader. The transmitter then completes generation of the last MAC subheader by eliminating the F and LF in the last MAC subheader in step 830. The values of the E field have the following meanings.

1: the presence of an F and an LF in a MAC subheader. If the LF is set to a certain value, for example, '0000 000' or '0000 0000 0000 000', the MAC subheader is the last one and MAC control information or a MAC SDU follows the MAC subheader. If the LF is not the certain value, the MAC subheader is followed by another MAC subheader.

0: the MAC subheader is the last one and does not include an F and an LF. The MAC subheader is followed by MAC control information or a MAC SDU.

Because the elimination of the last F and LF causes a 1- or 2-byte padding, the transmitter determines to include the last F and LF. Thus, the transmitter sets the E field to '1' indicating the inclusion of the F and LF in the last MAC subheader in step 835 and determines whether the elimination of the last F and LF causes a 1- or 2-byte padding in step 840. In the case of the 1-byte padding, the transmitter proceeds to step 845 and in the case of the 2-byte padding, the transmitter proceeds to step 855.

In step 845, the transmitter sets the F to '0' indicating the length of the LF is 7 bits. The transmitter then sets the LF to a predetermined value, for example, '0000 000' in step 850. The transmitter sets the F to '1' indicating the length of the LF is 15 bits in step 855 and sets the LF to a predetermined value, for example, '0000 0000 0000 000' in step 860. The predetermined value of '0000 000' or '0000 0000 0000 000' indicates that the MAC subheader is the last one, followed by a MAC SDU or MAC control information.

Upon completion of setting all fields of the MAC subheaders, the transmitter generates a MAC PDU by concatenating the MAC subheaders and the MAC SDUs and transmits it to the receiver through a lower layer in step 865.

A transmitter according to the second exemplary embodiment of the present invention can be easily realized from the afore-described transmitter according to the first exemplary embodiment of the present invention and thus will not be described in detail herein.

Figure 9:
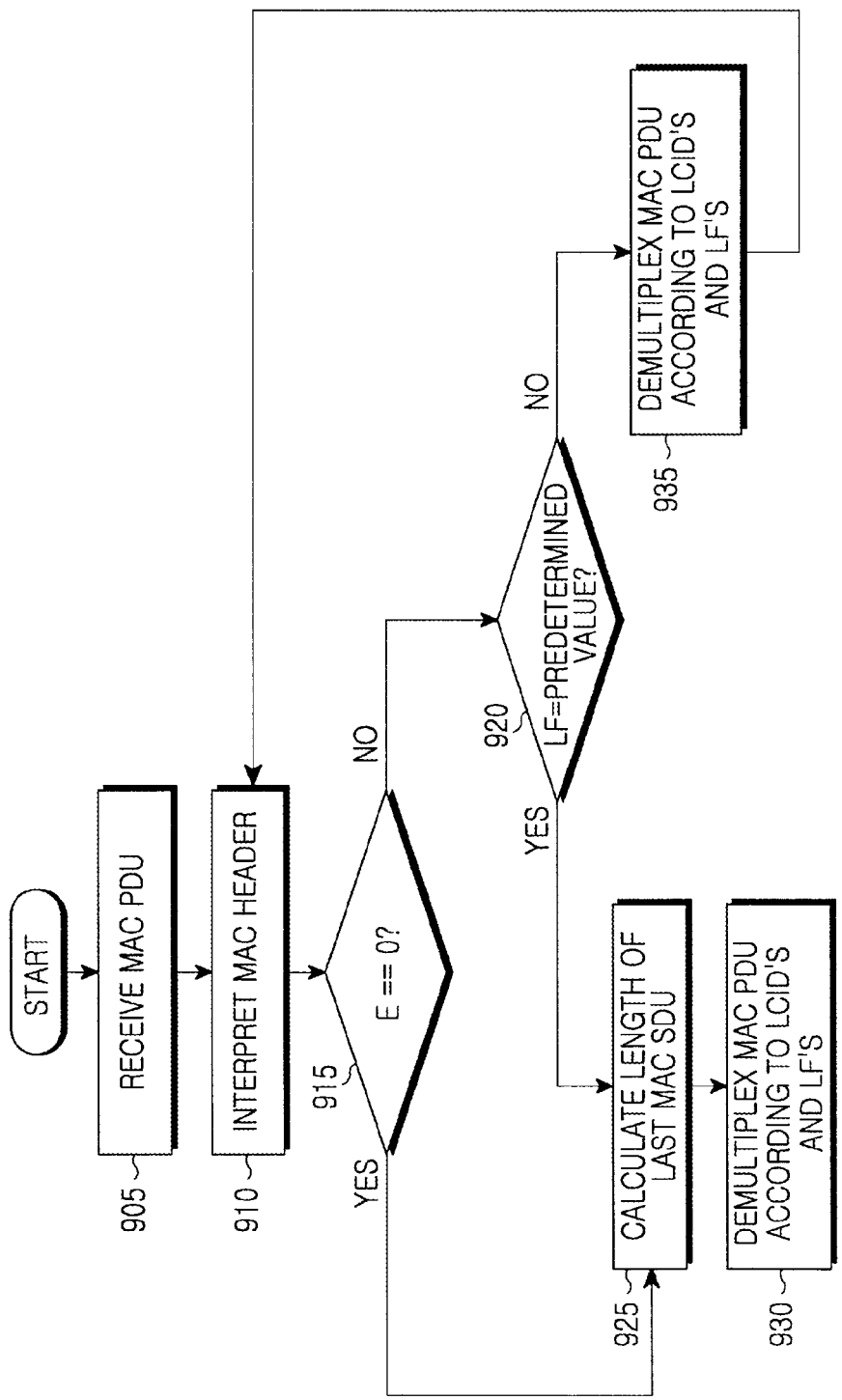
FIG. 9 is a flowchart illustrating a reception operation according to an exemplary embodiment of the present invention.

FIG. 9 is a flowchart illustrating a reception operation according to an exemplary embodiment of the present invention.

Referring to FIG. 9, the receiver receives a MAC PDU through a lower layer in step 905 and interprets the MAC subheaders of the MAC PDU by decoding in step 910. The MAC subheaders are interpreted in the order of their delivery in the MAC PDU. For each MAC subheader, in step 915 the receiver determines whether the E field of the MAC subheader is '0' indicating that a MAC SDU indicated by the MAC subheader is the last one and the MAC subheader does not include an F and an LF. If the E field is '0', the receiver determines the size of the MAC SDU by subtracting the sum of the lengths of the other MAC subheaders and the other MAC SDUs or MAC control information from the total size of the MAC PDU in step 925. In step 930, the receiver extracts the MAC SDUs from the MAC PDU by demultiplexing the MAC PDU according to the LCIDs of the MAC subheaders and the calculated MAC SDU sizes.

If it is determined that the E field is '1', which implies that the MAC subheader includes an F and an LF and the value of the LF indicates whether the byte following the MAC subheader belongs to another MAC subheader or a MAC SDU/MAC control information, the receiver determines whether the LF of the MAC subheader is a predetermined value, for example, '0000 000' or '0000 0000 0000 000' in step 920. If the LF is the predetermined value, which implies that the MAC subheader is the last one and thus the length of the last MAC SDU should be calculated, the receiver calculates the length of the last MAC SDU in step 925 and extracts the last MAC SDU from the MAC PDU according to the length of the last MAC SDU in step 930. Then the receiver ends the MAC PDU processing.

If the LF is not the predetermined value, the MAC subheader is not the last one and the LF indicates the length of a corresponding MAC SDU. Therefore, the receiver extracts the MAC SDUs from the MAC PDU using the LCIDs, Fs and LFs of the MAC subheaders in step 935 and returns to step 910 to process the next MAC subheader.

A receiver according to the second exemplary embodiment of the present invention can be easily realized from the afore-described receiver according to the first exemplary embodiment of the present invention and thus will not be described in detail herein.

As is apparent from the above description, exemplary embodiments of the present invention advantageously overcome problems encountered with generation and optimization of a MAC header since if a padding size required for generating a MAC PDU is equal to or less than the length of the last LF, a MAC header includes the last LF. The resulting decrease of a MAC PDU generation time increases a data communication speed.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for generating a Media Access Control Protocol Data Unit (MAC PDU) in a mobile communication system, the method comprising:
   checking Logical Channel Identifiers (LCIDs) of Media Access Control Service Data Units (MAC SDUs) to be multiplexed;
   determining the length of a Length Field (LF) for each of the MAC SDUs, referring to LF lengths predetermined for the LCIDs;
   generating a MAC header including the LCIDs and LFs of the determined lengths for the MAC SDUs; and
   generating a MAC PDU by attaching the MAC header to payload including the MAC SDUs,
   wherein the generating of the MAC header comprises, if a padding size required for the MAC PDU generation, calculated assuming the absence of a last LF in the MAC header, is larger than the length of the last LF, including the last LF in the MAC header, recalculating the required padding size taking into account the inclusion of the last LF, and adding a padding according to the re-calculated padding size.

2. The method of claim 1, wherein the generating of the MAC header further comprises, if the required padding size is equal to or less than the length of the last LF, including the last LF in the MAC header.

3. The method of claim 1, wherein the generating of the MAC header further comprises, if the required padding size is equal to or less than the length of the last LF, including the last LF in the MAC header and setting a predetermined reserved bit of the MAC header to a value indicating the inclusion of the last LF in the MAC header.

4. The method of claim 1, wherein the generating of the MAC header further comprises, if the required padding size is equal to or less than the length of the last LF, including the last LF in the MAC header and setting an E field related to a last MAC SDU of the MAC PDU to a value indicating the inclusion of the last LF in the MAC header.

5. The method of claim 1, wherein the generating of the MAC header further comprises, if the required padding size is equal to or less than the length of the last LF, including the last LF in the MAC header and setting the last LF to a predetermined pattern indicating the inclusion of the last LF in the MAC header.

6. The method of claim 1, wherein the generating of the MAC header further comprises, if the required padding size is equal to or less than the length of the last LF, including the last LF in the MAC header, setting an E field related to a last MAC SDU of the MAC PDU to a value indicating the inclusion of the last LF, and setting the last LF to a predetermined pattern indicating the inclusion of the last LF in the MAC header.

7. The method of claim 1, wherein the generating of the MAC header further comprises, if the required padding size is equal to or less than the length of the last LF, eliminating the last LF from the MAC header and setting an indicator indicating the absence of the last LF and the presence of a padding to a value indicating the required padding size in the MAC header.

8. The method of claim 1, wherein the LF lengths predetermined for the LCIDs comprise a minimum value required to express a Transport Block (TB) size.

9. A method of claim 1, wherein the generating of the MAC header comprises, if the padding size required for the MAC PDU generation, calculated assuming the absence of the last LF and a length indicator for the last LF in the MAC header, is larger than the sum of the lengths of the last LF and the length indicator, not including the last LF and the length indicator in the MAC header and setting an E field to a value indicating the absence of the last LF and the length indicator in the MAC header.

10. The method of claim 9, wherein the generating of the MAC header further comprises, if the required padding size is equal to or less than the sum of the lengths of the last LF and the length indicator, including the last LF and the length indicator in the MAC header, setting the E field to a value indicating the inclusion of the last LF and the length indicator, and setting the last LF to a predetermined value indicating a subheader including the last LF is a last subheader.

11. An apparatus for generating a Media Access Control Protocol Data Unit (MAC PDU) in a mobile communication system, the apparatus comprising:
at least one Radio Link Control (RLC) entity for providing Media Access Control Service Data Units (MAC SDUs) to be multiplexed to a multiplexer, for checking Logical Channel Identifiers (LCIDs) of the MAC SDUs, for determining the length of a Length Field (LF) for each of the MAC SDUs, for referring to LF lengths predetermined for the LCIDs, and for providing the LCIDs and the determined LF lengths to a header generator, wherein the header generator generates a MAC header including the LCIDs and LFs of the determined lengths for the MAC SDUs and provides the MAC header to the multiplexer,
the multiplexer multiplexes the MAC header with at least one of the MAC SDUs, and
if a padding size required for the MAC PDU generation calculated assuming the absence of a last LF in the MAC header is larger than the length of the last LF, the header generator includes the last LF in the MAC header, recalculates the required padding size taking into account the inclusion of the last LF, and adds a padding according to the re-calculated padding size.

12. The apparatus of claim 11, wherein if the required padding size is equal to or less than the length of the last LF, the header generator includes the last LF in the MAC header.

13. The apparatus of claim 11, wherein if the required padding size is equal to or less than the length of the last LF, the header generator includes the last LF in the MAC header and sets a predetermined reserved bit of the MAC header to a value indicating the inclusion of the last LF in the MAC header.

14. The apparatus of claim 11, wherein if the required padding size is equal to or less than the length of the last LF, the header generator includes the last LF in the MAC header and sets an E field related to a last MAC SDU of the MAC PDU to a value indicating the inclusion of the last LF in the MAC header.

15. The apparatus of claim 11, wherein if the required padding size is equal to or less than the length of the last LF, the header generator includes the last LF in the MAC header and sets the last LF to a predetermined pattern indicating the inclusion of the last LF in the MAC header.

16. The apparatus of claim 11, wherein if the required padding size is equal to or less than the length of the last LF, the head generator includes the last LF in the MAC header, sets an E field related to a last MAC SDU of the MAC PDU to a value indicating the inclusion of the last LF, and sets the last LF to a predetermined pattern indicating the inclusion of the last LF in the MAC header.

17. The apparatus of claim 11, wherein if the required padding size is equal to or less than the length of the last LF, the header generator does not include the last LF from the MAC header and sets an indicator indicating the absence of the last LF and the presence of a padding to a value indicating the required padding size in the MAC header.

18. The apparatus of claim 11, wherein the LF lengths predetermined for the LCIDs comprise a minimum value required to express a Transport Block (TB) size.

19. An apparatus of claim 11, wherein, if the padding size required for the MAC PDU generation, calculated assuming the absence of the last LF and a length indicator for the last LF in the MAC header, is larger than the sum of the lengths of the last LF and the length indicator, the header generator does not include the last LF and the length indicator in the MAC header and sets an E field to a value indicating the absence of the last LF and the length indicator in the MAC header.

20. The apparatus of claim 19, wherein, if the required padding size is equal to or less than the sum of the lengths of the last LF and the length indicator, the header generator includes the last LF and the length indicator in the MAC header, sets the E field to a value indicating the inclusion of the last LF and the length indicator, and sets the last LF to a predetermined value indicating a subheader including the last LF is a last subheader.

* * * * *